(12) United States Patent
Taki et al.

(10) Patent No.: US 10,546,582 B2
(45) Date of Patent: Jan. 28, 2020

(54) INFORMATION PROCESSING DEVICE, METHOD OF INFORMATION PROCESSING, AND PROGRAM

(71) Applicant: SONY CORPORATION, Tokyo (JP)

(72) Inventors: Yuhei Taki, Kanagawa (JP); Shinichi Kawano, Tokyo (JP); Takashi Shibuya, Tokyo (JP); Emiru Tsunoo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 7 days.

(21) Appl. No.: 15/515,010

(22) PCT Filed: Nov. 17, 2015

(86) PCT No.: PCT/JP2015/082325
§ 371 (c)(1),
(2) Date: Mar. 28, 2017

(87) PCT Pub. No.: WO2016/103988
PCT Pub. Date: Jun. 30, 2016

(65) Prior Publication Data
US 2017/0229121 A1    Aug. 10, 2017

(30) Foreign Application Priority Data
Dec. 26, 2014   (JP) ................ 2014-266615

(51) Int. Cl.
*G10L 15/22* (2006.01)
*G10L 25/84* (2013.01)
*G10L 15/28* (2013.01)
*G06F 3/16* (2006.01)
*G10L 15/18* (2013.01)

(52) U.S. Cl.
CPC .............. *G10L 15/22* (2013.01); *G06F 3/167* (2013.01); *G10L 15/1822* (2013.01); *G10L 15/28* (2013.01); *G10L 25/84* (2013.01)

(58) Field of Classification Search
CPC ........................................................ G10L 15/22
USPC .................................................. 704/275, 231
See application file for complete search history.

(56) References Cited

U.S. PATENT DOCUMENTS

| 5,864,815 A * | 1/1999 | Rozak ..................... G06F 3/167 704/231 |
| 6,075,534 A * | 6/2000 | VanBuskirk ............ G06F 3/167 704/275 |
| 6,202,046 B1 * | 3/2001 | Oshikiri .................. G10L 25/78 704/226 |

(Continued)

*Primary Examiner* — Jakieda R Jackson
(74) *Attorney, Agent, or Firm* — Paratus Law Group, PLLC

(57) ABSTRACT

There is provided an information processing device technology that enables an improvement in precision of sound recognition processing based on collected sound information, the information processing device including: a recognition controller that causes a speech recognition processing portion to execute sound recognition processing based on collected sound information obtained by a sound collecting portion; and an output controller that generates an output signal to output a recognition result obtained through the sound recognition processing. The output controller causes an output portion to output an evaluation result regarding a type of sound based on the collected sound information prior to the recognition result.

19 Claims, 24 Drawing Sheets

(56) References Cited

U.S. PATENT DOCUMENTS

| | | | | |
|---|---|---|---|---|
| 7,292,986 B1* | 11/2007 | Venolia | ............ | G06F 3/167 704/270 |
| 2002/0160341 A1* | 10/2002 | Yamada | ............ | G09B 5/065 434/157 |
| 2005/0038661 A1* | 2/2005 | Momosaki | ............ | G10L 25/00 704/275 |
| 2005/0131686 A1* | 6/2005 | Yamamoto | ............ | G06F 3/0237 704/231 |
| 2007/0073124 A1* | 3/2007 | Li | ............ | G06K 9/00516 600/323 |
| 2007/0225975 A1* | 9/2007 | Imoto | ............ | G10L 15/065 704/233 |
| 2009/0210227 A1* | 8/2009 | Sugiyama | ............ | G10L 15/22 704/246 |
| 2010/0138220 A1* | 6/2010 | Matsumoto | ............ | G10L 25/69 704/226 |
| 2013/0182914 A1* | 7/2013 | Sakai | ............ | H04N 7/141 382/115 |
| 2014/0330564 A1* | 11/2014 | Cox | ............ | G10L 15/02 704/238 |
| 2015/0039305 A1* | 2/2015 | Huang | ............ | G10L 15/20 704/233 |
| 2015/0127330 A1* | 5/2015 | Lamy | ............ | G10L 21/0216 704/226 |
| 2015/0179186 A1* | 6/2015 | Swierk | ............ | G06F 3/167 704/276 |
| 2016/0162473 A1* | 6/2016 | Cogley | ............ | G06F 17/28 704/9 |

* cited by examiner

FIG. 11
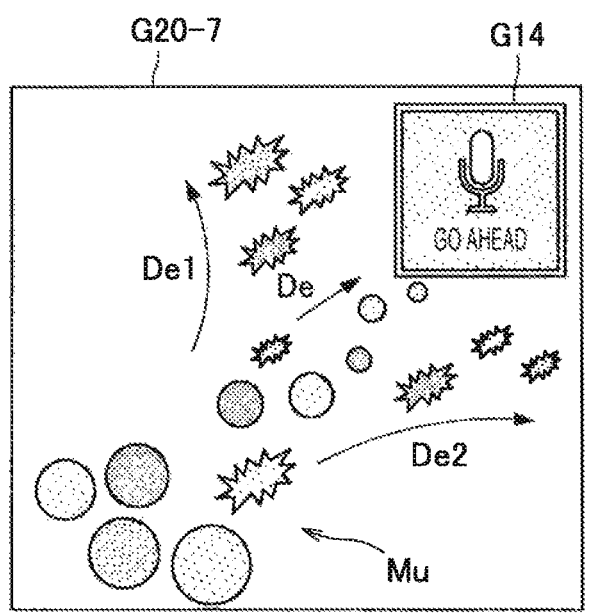
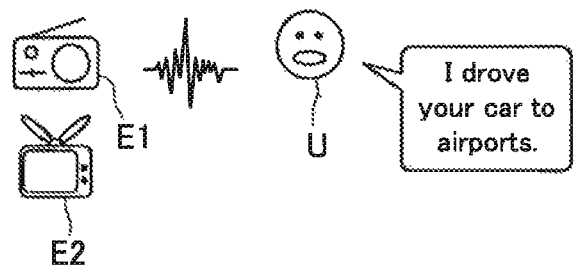

FIG. 18

| LIKELIHOOD OF SPEECH \ VOLUME | HIGH | LOW |
|---|---|---|
| HIGH | USER IS IN COURSE OF UTTERANCE | UTTERANCE WITH INSUFFICIENT VOLUME (SILENT PART CAN BE DETECTED) |
| LOW | ENVIRONMENT WITH NOISE (ISSUE EVENT E_skeptic) | UTTERANCE COMPLETED (DETECT SILENT PART) |

FIG. 21

| VOLUME / LIKELIHOOD OF SPEECH | HIGH | LOW |
|---|---|---|
| HIGH | (IN COURSE OF UTTERANCE) | ENVIRONMENT WHERE SILENT PART CAN BE DETECTED (POSSIBILITY OF SPEAKING WITH SMALL VOICE) |
| LOW | ENVIRONMENT WITH NOISE (CHANGE INPUT METHOD Ex. TO PTT) | ORDINARY ENVIRONMENT (QUIET ENVIRONMENT) |

# INFORMATION PROCESSING DEVICE, METHOD OF INFORMATION PROCESSING, AND PROGRAM

CROSS REFERENCE TO PRIOR APPLICATION

This application is a National Stage Patent Application of PCT International Patent Application No. PCT/JP2015/082325 (filed on Nov. 17, 2015) under 35 U.S.C. § 371, which claims priority to Japanese Patent Application No. 2014-266615 (filed on Dec. 26, 2014), which are all hereby incorporated by reference in their entirety.

TECHNICAL FIELD

The present disclosure relates to an information processing device, a method of information processing, and a program.

BACKGROUND ART

In recent years, there has been a technology of recognizing character strings by acquiring information collected by a microphone (hereinafter, also simply referred to as "collected sound information") and performing speech recognition processing on the collected sound information. Meanwhile, a technology of evaluating the likelihood that collected sound information is speech has been disclosed (see Patent Literatures 1 and 2, for example).

CITATION LIST

Patent Literature

Patent Literature 1: JP 2010-38943A
Patent Literature 2: JP 2007-328228 A

DISCLOSURE OF INVENTION

Technical Problem

However, it is desirable to provide a technology that enables an improvement in precision of sound recognition processing based on collected sound information.

Solution to Problem

According to the present disclosure, there is provided an information processing device including: a recognition controller that causes a speech recognition processing portion to execute sound recognition processing based on collected sound information obtained by a sound collecting portion; and an output controller that generates an output signal to output a recognition result obtained through the sound recognition processing. The output controller causes an output portion to output an evaluation result regarding a type of sound based on the collected sound information prior to the recognition result.

According to the present disclosure, there is provided a method of information processing, including: causing a speech recognition processing portion to execute sound recognition processing based on collected sound information obtained by a sound collecting portion; and generating an output signal to output a recognition result obtained through the sound recognition processing. An output portion is caused to output an evaluation result regarding a type of sound based on the collected sound information prior to the recognition result.

According to the present disclosure, there is provided a program that causes a computer to function as an information processing device including: a recognition controller that causes a speech recognition processing portion to execute sound recognition processing based on collected sound information obtained by a sound collecting portion; and an output controller that generates an output signal to output a recognition result obtained through the sound recognition processing. The output controller causes an output portion to output an evaluation result regarding a type of sound based on the collected sound information prior to the recognition result.

Advantageous Effects of Invention

According to the present disclosure, a technology that enables an improvement in precision of sound recognition processing based on collected sound information as described above is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 11 is a diagram illustrating an example of two evaluation result objects with different motion.

FIG. 18 is a diagram illustrating an example of processing corresponding to combinations between the likelihood of speech and the volume when an utterance ends.

FIG. 21 is a diagram illustrating an example of processing corresponding to combinations between the likelihood of speech and the volume when an utterance ends.

MODE(S) FOR CARRYING OUT THE INVENTION

Figure 1:
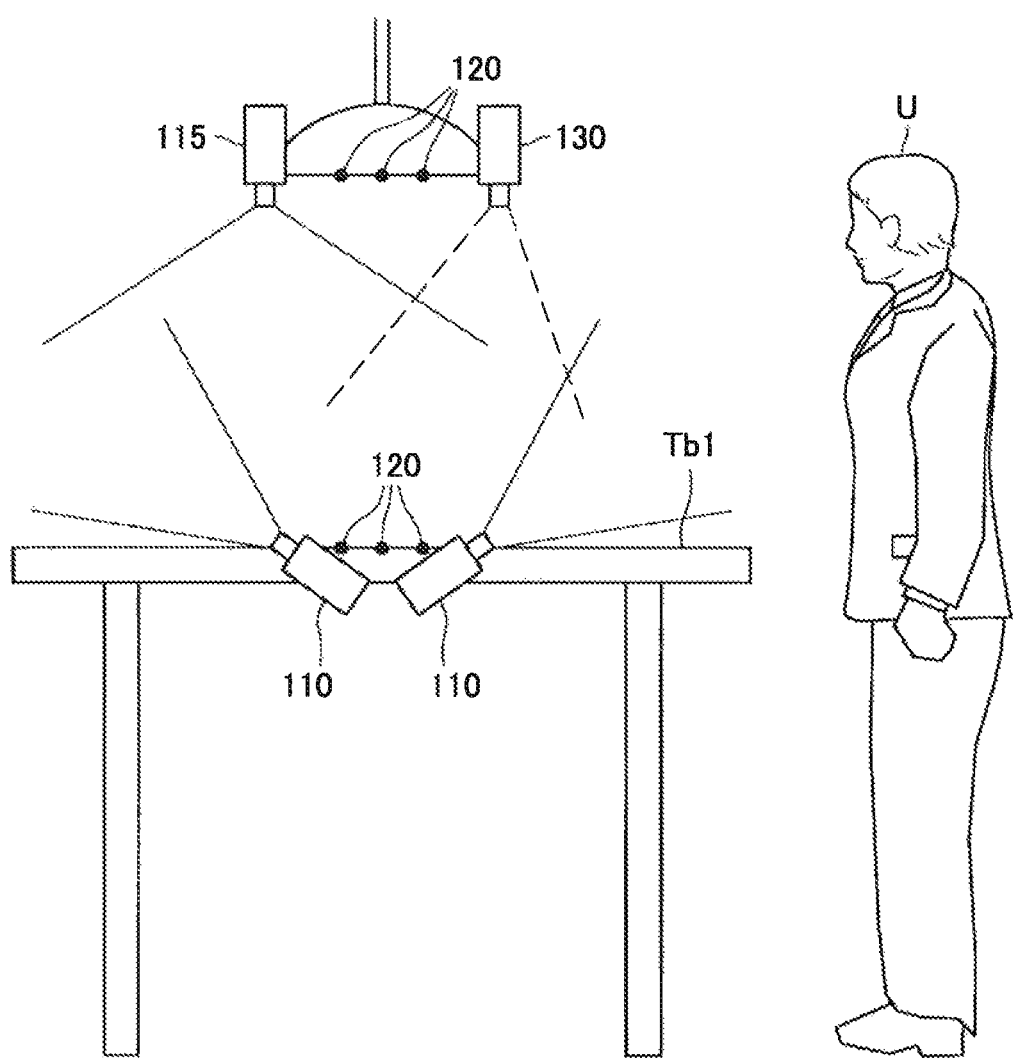
FIG. 1 is a diagram illustrating a configuration example of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Description will be given in the fallowing order.
1. Embodiment of present disclosure
1.1 System configuration example
1.2 Functional configuration example
1.3 Functional details of information processing system
1.4. Modification example when utterance ends
1.5. Modification example when utterance starts
1.6 Modification example of display form
1.7. Other modification examples
1.8 Hardware configuration example
2. Conclusion
<1. Embodiment of Present Disclosure>
[1.1. System Configuration Example]

A configuration example of an information processing system 10 according to an embodiment of the present disclosure is described with reference to the drawings. FIG. 1 is a diagram illustrating a configuration example of the information processing system 10 according to an embodiment of the present disclosure. As illustrated in FIG. 1, the information processing system 10 according to the embodiment of the present disclosure is configured to include an image input portion 110, an operation input portion 115, a sound collecting portion 120, and an output portion 130. The information processing system 10 is capable of performing sound recognition processing based on the speech uttered by a user U (hereinafter also simply referred to as "user"). In the following description, voice or speech and sound are distinctly used.

The image input portion 110 has a function of inputting an image. In the example illustrated in FIG. 1, the image input portion 110 includes two cameras embedded in a table Tb1. However, the number of cameras included in the image input portion 110 is not limited to the particular number as long as it is one or more, In such a case, the position where, each of one or more cameras included in the image input portion 110 is provided is also not limited to a particular position. In addition, one or more cameras may include a monocular camera or a stereo camera.

The operation input portion 115 has a function of inputting an operation of the user U. In the example illustrated in FIG. 1, the operation input portion 115 includes one camera suspended from the ceiling above the table Tb1. However, the position at which the camera included in the operation input portion 115 is provided is not limited to a particular position. In addition, the camera may include a monocular camera or a stereo camera. In addition, the operation input portion 115 may be anything other than a camera as long as it has a function of inputting the operation of the user U, and may be, for example, a touch panel or a hardware button.

The output portion 130 has a function of displaying a screen on the table Tb1. In the example illustrated in FIG. 1, the output portion 130 is suspended from the ceiling above the table Tb1. However, the position at which the output portion 130 is provided is not limited to a particular position. In addition, the output portion 130 may typically be a projector capable of projecting a screen onto the top surface of the table Tb1, but it may be other types of display as long as it has a function of displaying a screen.

Moreover, although the case where the top surface of the table Tb1 is the display surface of the screen is mainly described herein, the display surface of the screen may be other than the top surface of the table Tb1. An example of the display surface of the screen may include a wall, a building, a floor surface, a ground surface, a ceiling, or a surface at other place. In addition, in the case where the output portion 130 has its own display surface, the display surface of the screen may he a display surface of the output portion 130.

The sound collecting portion 120 has a function of collecting sound. In the example illustrated in FIG. 1, the sound collecting portion 120 includes a total of six microphones, that is, three microphones above the table Tb1 and three microphones present on the upper surface of the table Tb1. However, the number of microphones included in the sound collecting portion 120 is not limited to the particular number as long as it is one or more. In such a case, the position where one or more microphones included in the sound collecting portion 120 are provided is also not limited to a particular position.

However, if the sound collecting portion 120 includes a plurality of microphones, an arrival direction of sound can be estimated on the basis of collected sound information collected by each of the plurality of microphones. If the sound collecting portion 120 includes a microphone with directivity, the arrival direction of sound can be estimated on the basis of collected sound information collected by the microphone with directivity.

The above description is given as to the configuration example of the information processing system 10 according to an embodiment of the present disclosure.

[1.2. Functional Configuration Example]

Figure 2:
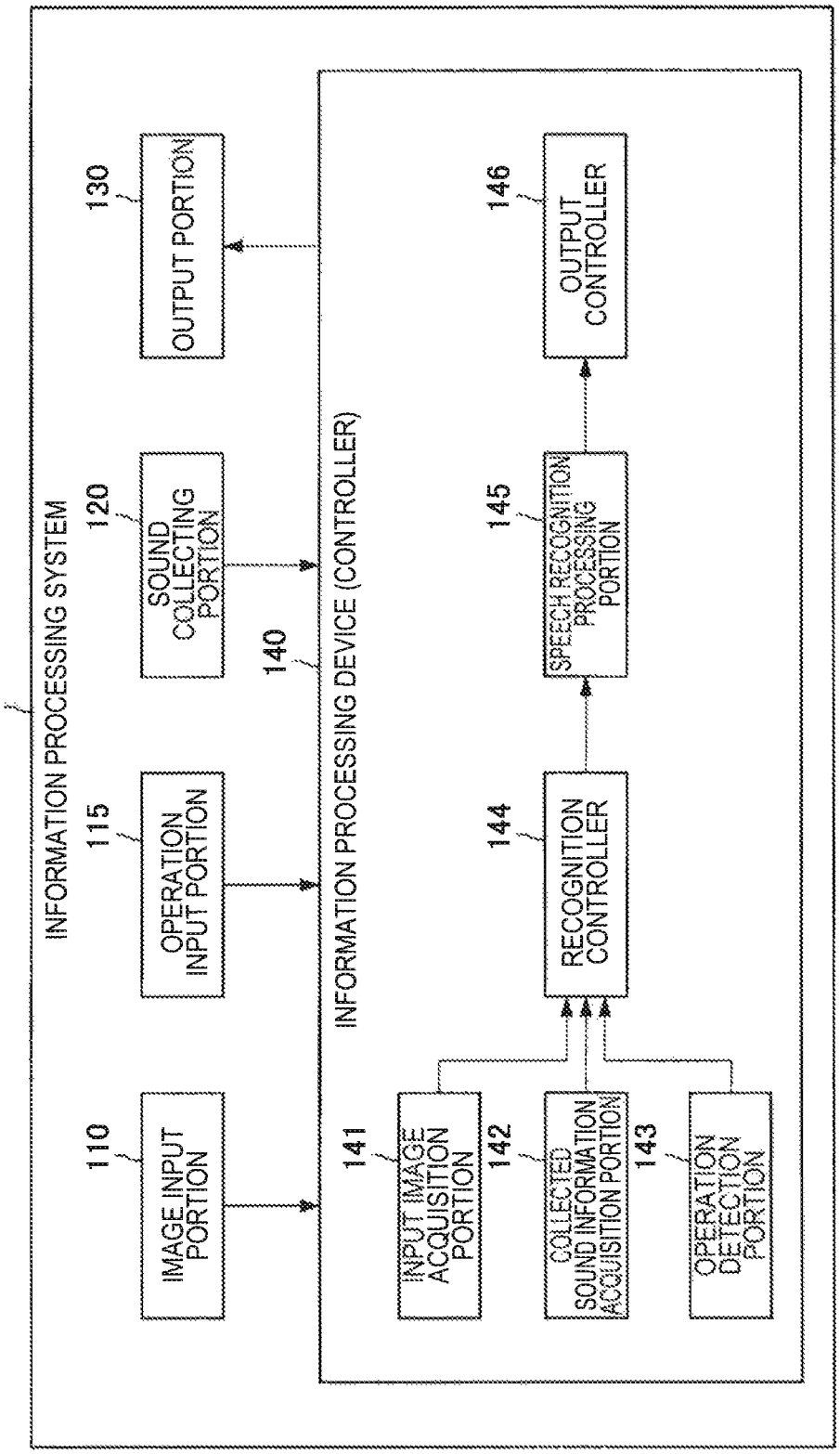
FIG. 2 is a block diagram illustrating a functional configuration example of the information processing system according to the embodiment.

Subsequently, a functional configuration example of the information processing system 10 according to an embodiment of the present disclosure is described. FIG. 2 is a block diagram illustrating a functional configuration example of the information processing system 10 according to an embodiment of the present disclosure. As illustrated in FIG. 2, the information processing system 10 according to an embodiment of the present disclosure is configured to include the image input portion 110, the operation input portion 115, the sound collecting portion 120, the output portion 130, and an information processing device 140 (hereinafter also referred to as "controller 140").

The information processing device 140 controls each component of the information processing system 10. In one example, the information processing device 140 generates information to be output from the output portion 130. In addition, in one example, the information processing device 140 incorporates the information, which is input by each of the image input portion 110, the operation input portion 115, and the sound collecting portion 120, in the information to be output from the output portion 130. As illustrated in FIG. 2, the information processing device 140 includes an input image acquisition portion 141, a collected sound information acquisition portion 142, an operation detection portion 143, a recognition controller 144, a speech recognition processing portion 145, and an output controller 146. These respective functional blocks will be described later in detail.

Moreover, the information processing device 140 may be composed of, for example, a central processing unit (CPU). In the case where the information processing device 140 is composed of a processing device such as CPU, this processing device can be composed of an electronic circuit.

The above description is given as to the functional configuration example of the information processing system 10 according to an embodiment of the present disclosure.

[1.3 Functional Details of Information Processing System]

Next, functional details of the information processing system 10 according to the embodiment of the present disclosure will be described. In the embodiment according to the present disclosure, the sound collecting portion 120 collects sound, the recognition controller 144 causes the speech recognition processing portion 145 to execute sound recognition processing based on collected sound information obtained by the sound collecting portion 120, and the output controller 146 generates an output signal to output a recognition result obtained by the speech recognition processing. Here, the output controller 146 causes the output portion 130 to output an evaluation result regarding a type of sound based on the collected sound information prior to the recognition result.

With such a configuration, it is possible for a user to adjust utterance by recognizing the evaluation result regarding the type of sound of the collected sound information, and to thereby improving prevision of the sound recognition processing based on the collected sound information. For example, there is a possibility that feeding back only the volume of the collected sound information to the user, for example, leads to misunderstanding that speech of utterance by the user has been collected even if the volume of noise is high and enough speech of utterance by the user has not been collected. Also, there is a possibility that user does not notice that sound recognition processing has not been performed on speech of utterance by the user themselves even when the user produces utterance in such a manner that the utterance does not become a target of sound recognition processing. The embodiment according to the present disclosure can also reduce such possibilities.

Although likelihood of speech is mainly used as a type of sound in the description in the specification, the type of sound is not limited to the likelihood of speech. For example, the type of sound may be likelihood of music, likelihood of humming, or likelihood of TV sound. Also, the sound recognition processing is not particularly limited. As will be described below, the sound recognition processing may include processing of specifying a character string on the basis of collected sound information. For specifying a character string, speech recognition processing may be used, or music recognition processing may be used. The sound recognition processing may include speech recognition processing based on collected sound information.

Although an example in which a recognition result and an evaluation result are output from the same output portion 130 will be mainly described in the specification, the recognition result and the evaluation result may not be output from the same output portion 130. For example, the recognition result may be output from the output portion 130 while the evaluation result may be output from an output portion (ahead mount display, for example) that is different from the output portion 130 and is not illustrated in the drawing.

Although an example in which both speech recognition processing and sound type evaluation are performed on the same collected sound information obtained by the sound collecting portion 120 will be mainly described in the specification, not both the speech recognition processing and the sound type evaluation may be performed on the same collected sound information. For example, an analog signal obtained by the sound collecting portion 120 may be converted into a first signal and a second signal that are different from each other, the speech recognition processing may be performed on the first signal, and the sound type evaluation may be performed on the second signal. Therefore, it is only necessary to perform both the speech recognition processing and the sound type evaluation on the basis of the analog signal obtained by the sound collecting portion 120.

Figure 3:
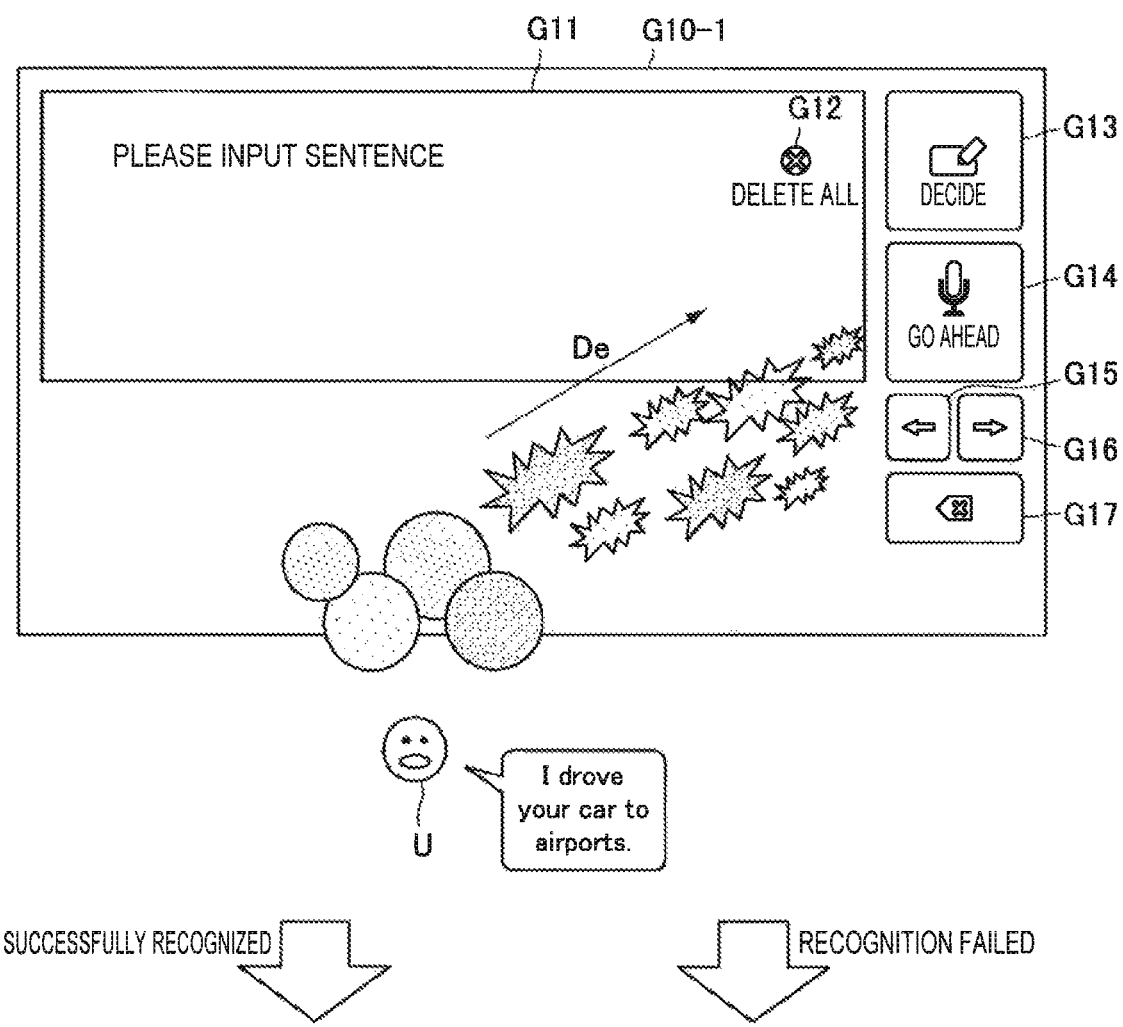
FIG. 3 is a diagram illustrating an example of a screen during sound collection that is displayed by an output portion.

A format of data output by the output portion 130 is not particularly limited. For example, the output controller 146 may cause the output portion 130 to display an object corresponding to the evaluation result (hereinafter, also referred to as an "evaluation result object"). FIG. 3 is a diagram illustrating an example of a screen during sound collection that is displayed by the output portion 130. First, the user performs an operation of selecting a speech recognition processing start operation object G14, and if the operation of selecting the speech recognition processing start operation object G14 is input through the operation input portion 115, the input is detected by the operation detection portion 143, and the output controller 146 causes an initial screen, which is not illustrated in the drawing, to be displayed. If the output controller 146 causes the initial screen, which is not illustrated in the drawing, to be displayed, the user starts to utter toward the sound collecting portion 120.

Referring to FIG. 3, the output controller 146 causes a screen G10-1 during sound collection to be displayed. The screen G10-1 during sound collection includes the speech recognition processing start operation object G14 for starting the speech recognition processing and a recognized character string display section G11 that is a display section for a character string obtained by the speech recognition processing (hereinafter, also referred to as a "recognized character string").

Also, the screen G10-1 during sound collection include an all-deletion operation object G12 for deleting the entirety of the recognized character string and a decision operation object G13 for deciding the recognized character string. Also, the screen G10-1 during sound collection includes a moving operation object G15 for moving a cursor position at the recognized character string backward, a moving operation object G16 for moving the cursor position at the recognized character string forward, and a deletion operation object G17 for deleting a character or a word at the cursor position.

As illustrated as the screen G10-1 during sound collection, if the collected sound information collected by the sound collecting portion 120 is acquired by the collected sound information acquisition portion 142, the output controller 146 causes evaluation result objects Mu corresponding to an evaluation result obtained by evaluation on likelihood of speech to be displayed before a recognition result obtained by the speech recognition processing. The evaluation result objects Mu may stand still or have motion as illustrated on the screen G10-1 during sound collection. When the evaluation result object Mu has movement, for example, a moving direction De of the evaluation result object Mu may depend on an arrival direction of voice of utterance by the user from a sound source to the sound collecting portion 120. A method of estimating the arrival direction of the voice of utterance by the user is also not particularly limited.

For example, the recognition controller 144 may estimate one arrival direction that coincides with or is similar to a direction of a finger of the user (a direction from the root to the tip of the finger, for example) who has performed the operation of selecting the speech recognition processing start operation object G14 as the arrival direction of the voice of utterance by the user. A range of similarity may be determined in advance. The direction of the finger may be acquired by analyzing an input image.

Alternatively, the recognition controller 144 may estimate an arrival direction of sound input by the sound collecting portion 120 as the arrival direction of the voice of utterance by the user. If there are a plurality of arrival directions of sound, an arrival direction of sound initially input from among the plurality of arrival directions may be estimated as the arrival direction of the voice of utterance by the user, or one arrival direction that coincides with or is similar to the direction of the finger of the user who has performed the operation of selecting the speech recognition processing start operation object G14 from among the plurality of arrival directions may be estimated as the arrival direction of the voice of utterance by the user.

Alternatively, the recognition controller 144 may estimate an arrival direction of sound with the largest volume input by the sound collecting portion 120 from among the plurality of arrival directions as the arrival direction of the voice of utterance by the user. In this manner, the arrival direction of the voice of utterance by the user can be estimated. In contrast, the recognition controller 144 may acquire, as noise, sound input by the sound collecting portion 120 from directions other than the arrival direction of the voice of utterance by the user.

FIG. 3 illustrates an example in which the output controller 146 moves the evaluation result objects Mu in the arrival direction (moving direction De) of the voice of utterance by the user. In this manner, the user can intuitively recognize that the voice of utterance by the user themselves is being collected by the sound collecting portion 120. However, the movement of the evaluation result objects Mu is not limited to such movement. FIG. 3 illustrates an example in which the destination of the evaluation result objects Mu is the speech recognition processing start operation object G14. However, the destination of the evaluation result objects Mu is not limited to such an example.

Although FIG. 3 illustrates the example in which the output controller 146 causes the circular evaluation result objects Mu that have appeared one after another to be moved in accordance with the sound collection performed by the sound collecting portion 120, the display state of the evaluation result objects Mu is not limited to such an example. For example, the output controller 146 may control various parameters of the evaluation result objects Mu on the basis of predetermined information (likeliness of speech of the collected sound information and volume, for example) in accordance with the collected sound information. The collected sound information used at this time may be collected sound information from the arrival direction of the voice of utterance by the user. The parameters of the evaluation result objects Mu may include at least any one of the shape, the transparency, the color, the size, and the motion of the evaluation result objects Mu.

A method of evaluating the likelihood of speech in the collected sound information is not particularly limited. For example, it is also possible to employ a method described in a patent literature (JP 2010-38943A) as the method of evaluating the likelihood of speech in the collected sound information. It is also possible to employ a method described in a patent literature (JP 2007-328228A) as the method of evaluating the likelihood of speech in the collected sound information. Although an example in which the evaluation of the likelihood of speech is performed by the output controller 146 will be described herein, the evaluation of the likelihood of speech may be performed by a server which is not illustrated in the drawing.

The recognition controller 144 causes the speech recognition processing portion 145 to start speech recognition processing on the collected sound information acquired by the collected sound information acquisition portion 142. Timing at which the speech recognition processing is started is not limited. For example, the recognition controller 144 may causes the speech recognition processing portion 145 to start the speech recognition processing on the collected sound information corresponding to the evaluation result objects Mu after the evaluation result objects Mu has arrived the speech recognition processing start operation object G14. The evaluation result objects Mu that have reached the speech recognition processing start operation object G14 may be displayed such that the evaluation result objects Mu are gathering at the speech recognition processing start operation object G14.

Here, termination of a part serving as a target of the speech recognition processing may be determined in any way. For example, the recognition controller 144 may detect whether or not there is a part in which a volume is continuously less than a predetermined volume for a period of time that is greater than a threshold value (hereinafter, also simply referred to as a "silent part") in the collected sound information and determine the termination of the part serving as the target of the speech recognition processing on the basis of the timing at which the silent part is detected. A screen G10-3 is a screen displayed when the silent part is detected.

As illustrated as the screen G10-3, the timing at which the silent part is detected may be determined as the termination of the part serving as the target of the speech recognition processing. The screen G10-3 is a screen after the termination of the part serving as the target of the speech recognition processing is determined. Referring to the screen G10-3, the evaluation result objects Mu have increased. Subsequently, the speech recognition processing portion 145 causes the speech recognition processing portion 145 to perform the speech recognition processing on a part or the entirety of the collected sound information. Specifically, the recognition controller 144 causes the speech recognition processing portion 145 to perform the speech recognition processing on the collected sound information except for the silent part.

The speech recognition processing portion 145 performs the speech recognition processing on the collected sound information except for the silent part. For example, the speech recognition processing portion 145 preferably acquires a recognized character string by performing the speech recognition processing on the collected sound information from an arrival direction of speech uttered by the user. Since this allows the speech recognition processing to be performed on speech with less noise as compared with a case where the speech recognition processing is performed directly on speech input by the sound collecting portion 120, an improvement in precision of the speech recognition processing can be expected. The following operation differs depending on whether or not the speech recognition processing has successfully been performed.

Figure 4:
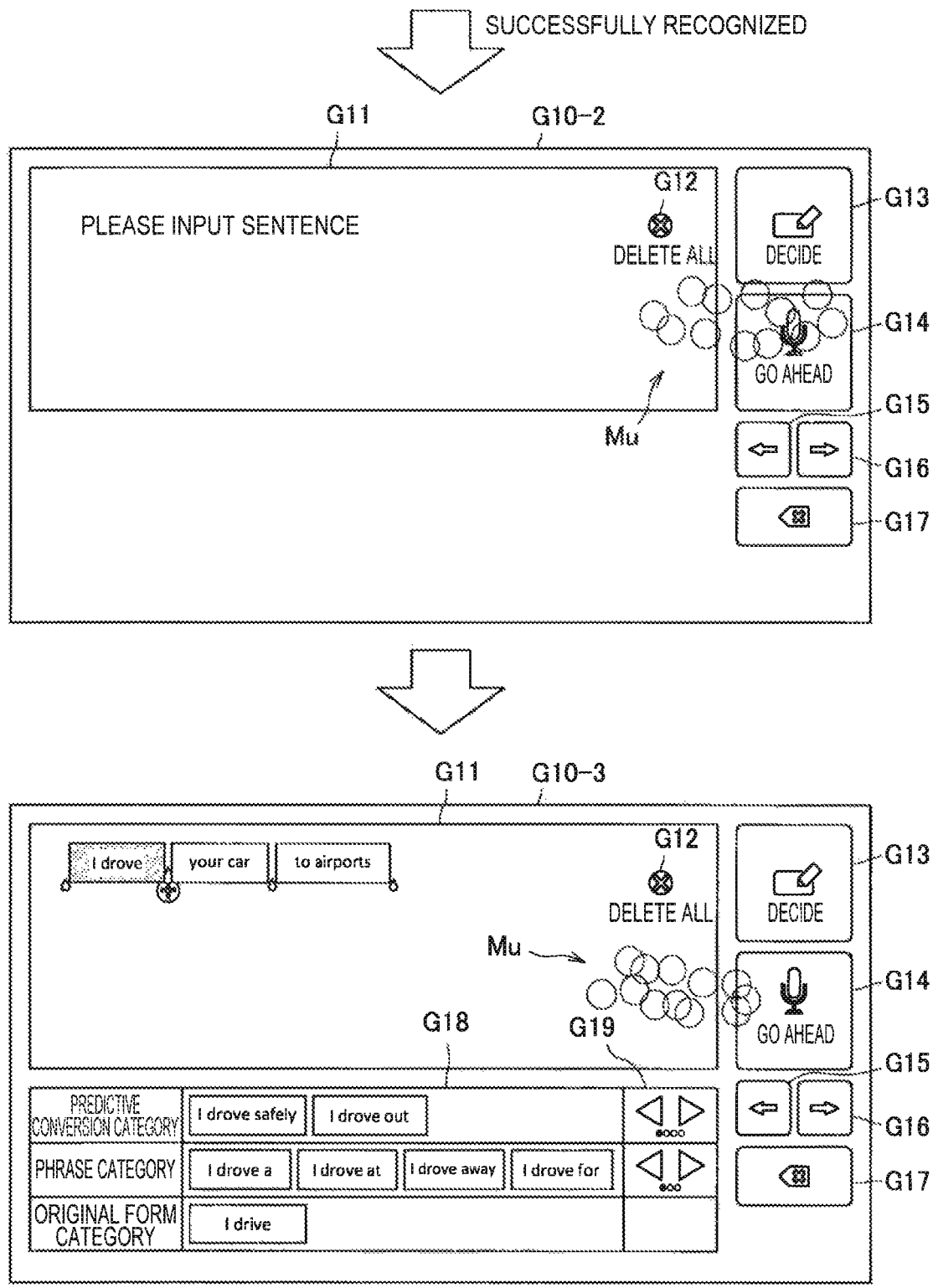
FIG. 4 is a diagram illustrating an example of display when speech recognition processing has been performed successfully.

FIG. 4 is a diagram illustrating an example of display when the speech recognition processing has successfully been performed. As illustrated as a screen G10-2, if the speech recognition processing portion 145 has successfully performed the speech recognition processing, the output controller 146 may move the evaluation result objects MU to the side of the recognized character string display section G11. This allows the user to predict that the recognized character string will be displayed in the recognized character string display section G11. As illustrated as the screen G10-2, the output controller 146 may further move the evaluation result objects Mu to the side of the recognized character string display section G11.

Referring to the screen G10-2, the output controller 146 causes the recognized character string "I drove your car to airports" to be displayed in the recognized character string display section G11. In addition, the output controller 146 causes a selection candidate display section G18, a selection candidate switching operation object G19, and the like to be displayed. Although selection candidates displayed in the selection candidate display section G18 are not particularly limited, a predictive conversion category, a phrase category, and an original form category, and the like are displayed as selection candidates in the example illustrated as the screen G10-12.

Figure 5:
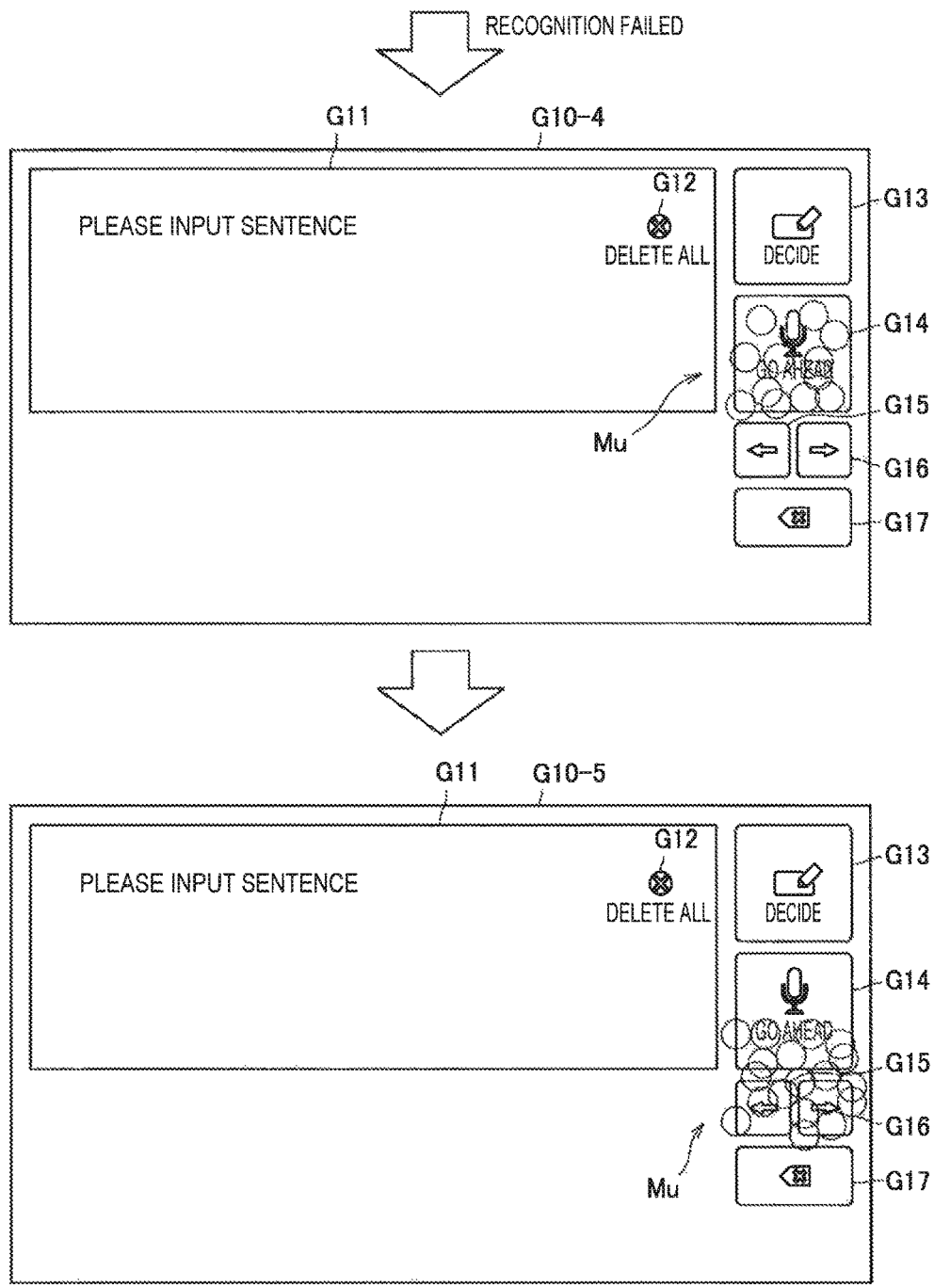
FIG. 5 is a diagram illustrating an example of display when the speech recognition processing has failed.

FIG. 5 is a diagram illustrating an example of display when the speech recognition processing is failed. If the speech recognition processing by the speech recognition processing portion 145 is failed, the output controller 146 may move the evaluation result objects Mu to the side where the recognized character string display section G11 is not present (to the lower side, for example) as illustrated as a screen G10-4. This enables the user to predict that the speech recognition processing has been failed. As illustrated as a screen G10-4, the output controller 146 may further move the evaluation result objects Mu to the side where the recognized character string display section G11 is not present (to the lower side, for example).

Although the display form of the evaluation result objects Mu may be constant, the evaluation result objects Mu may be changed depending on a relationship between the evaluation result of likelihood of speech and a threshold value. For example, the output controller 146 may cause the output portion 130 to output different evaluation result objects Mu when the evaluation result is greater than the threshold value and when the evaluation result is less than the threshold value. In this manner, the user can easily recognize the evaluation result of the likelihood of speech.

Figure 6:
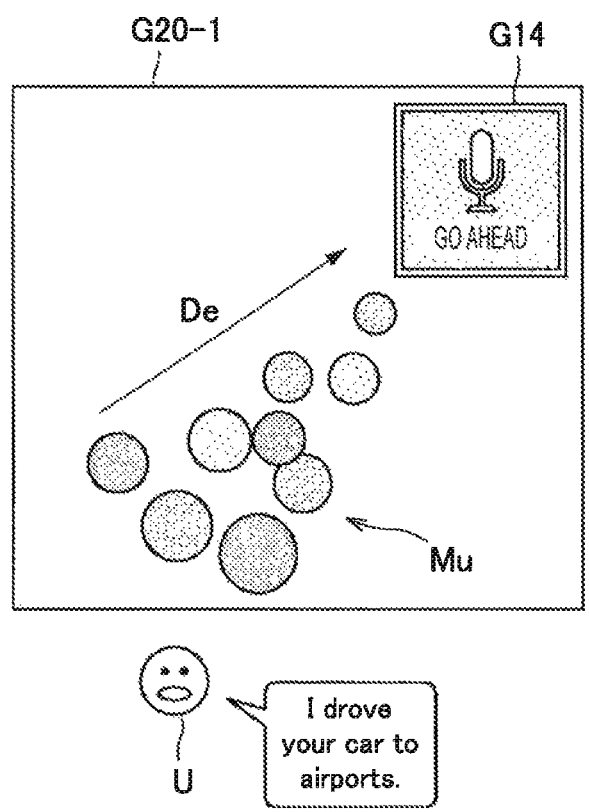
FIG. 6 is a diagram illustrating an example of a display screen (excerption of a part of the entire screen) of an evaluation result object when an evaluation result of likelihood of speech is greater than a threshold value.
Figure 7:
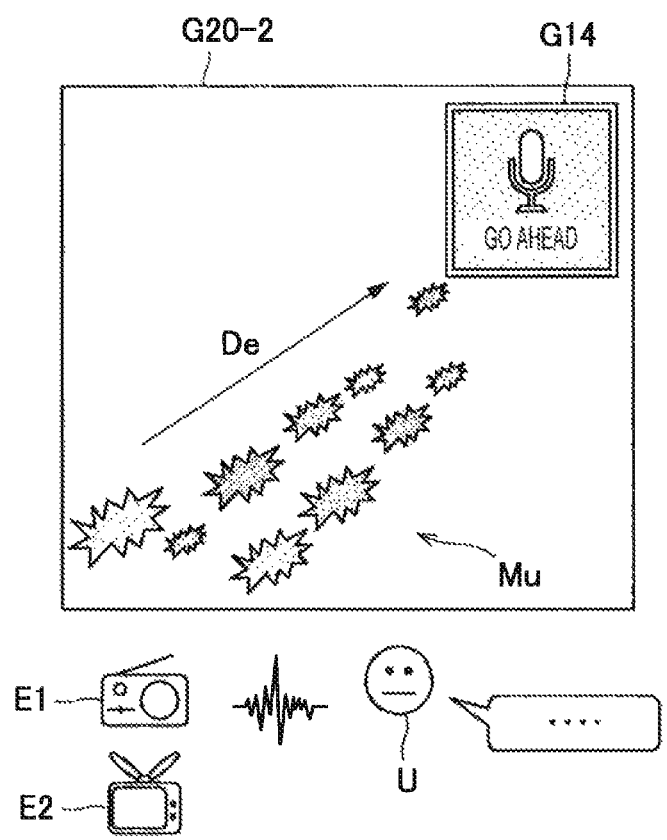
FIG. 7 is a diagram illustrating an example of the display screen (excerption of a part of the entire screen) of the evaluation result object when the evaluation result of likelihood of speech is less than the threshold value.
Figure 8:
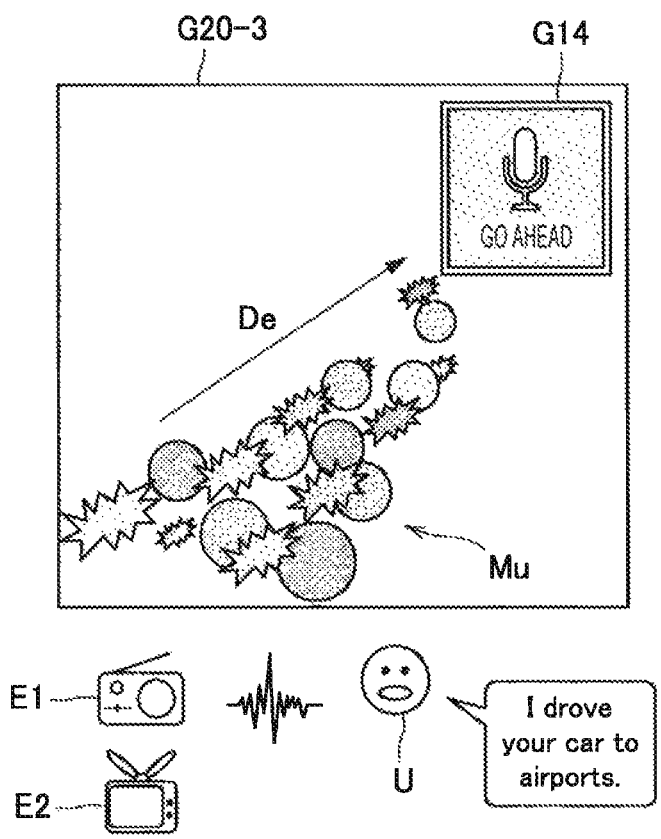
FIG. 8 is a diagram illustrating an example (excerption of a part of the entire screen) when the evaluation result of the likelihood of speech becomes greater and less than the threshold value.

FIG. 6 is a diagram illustrating an example of a display screen of the evaluation result objects MU (excerption of a part of the entire screen) when the evaluation result of the likelihood of speech is greater than the threshold value. FIG. 7 is a diagram illustrating an example of a display screen of the evaluation result objects Mu (exception of a part of the entire screen) when the evaluation result of the likelihood of speech is less than the threshold value. FIG. 8 is a diagram illustrating an example (exception of a part of the entire screen) when the evaluation result of the likelihood of speech becomes greater and less than the threshold value.

Referring to a screen G20-1, a user U is producing utterance, and not particular noise is being generated. Since the evaluation result of the likelihood of speech is greater than the threshold value in this example, the output controller 146 may cause the output portion 130 to output the evaluation result objects Mu in a first display form (a circular shape, for example). In contrast, referring to a screen G20-2, noise is being generated from devices E1 and E2, and the user U is not particularly producing utterance. Since the evaluation result of the likelihood of speech is less than the threshold value in this example, the output controller 146 may cause the output portion 130 to output the evaluation result objects Mu in a second display form (a shape with a sharp contour, for example) that is different from the first display form (the circular shape, for example).

Furthermore, referring to a screen G20-3, noise is being generated from the devices E1 and E2, and the user U is also producing utterance. At this time, since the evaluation result of the likelihood of speech becomes greater and less than the threshold value, the evaluation result objects Mu may be switched between the two different display forms (the circular shape and the shape with the sharp contour, for example) on the basis of the evaluation result of the likelihood of speech.

Although the evaluation result objects Mu is maintained in the same display form until the evaluation result objects Mu reach the speech recognition processing start operation object G14 after appearance in the example described above, the evaluation result objects Mu may change until the evaluation result objects Mu reach the speech recognition processing start operation object G14 after appearance. For example, the output controller 146 may cause the output portion 130 to display a sound collection notification object for notification of sound collection when the collected sound information is obtained, and may change the sound collection notification object to the evaluation result object in accordance with the evaluation result when the evaluation result is obtained. This allows the user themselves to recognize a part that is likely to correspond to speech and a part that is not likely to correspond to speech in the speech uttered.

Figure 9:
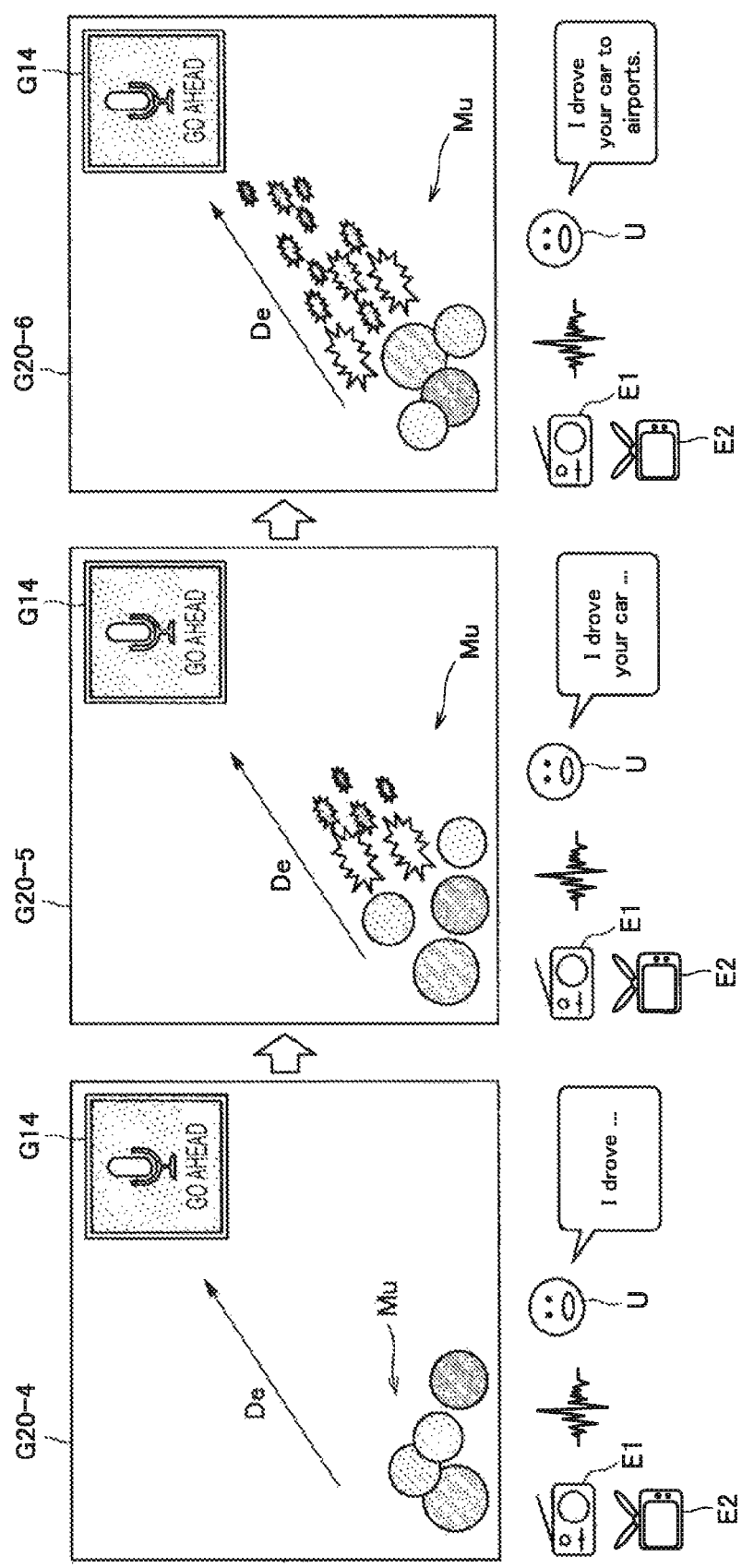
FIG. 9 is a diagram illustrating an example of a change from a sound collection notification object to an evaluation result object.

FIG. 9 is a diagram illustrating an example of a change from the sound collection notification object to the evaluation result object. First, as illustrated as a screen 20-4, the output controller 146 may cause the output portion 130 to display the sound collection notification objects Mu when collected sound information is obtained. Although the output controller 146 may cause the output portion 130 to always display constant sound collection notification objects at this time, the output controller 146 may change the sound collection notification objects in accordance with the volume of the collected sound information. That is, the output controller 146 may cause the output portion 130 to display the sound collection notification objects Mu in a stage where the sound has been collected. This allows the user to recognize the volume of utterance by the user themselves. In this stage, the evaluation result of the likelihood of speech may have not been obtained.

Referring to a screen 20-5, the output controller 146 has changed the evaluation result objects Mu in the first display form (the circular shape, for example) to the evaluation result objects Mu in the second display form (the shape with the sharp contour, for example). Similarly, referring to a screen 20-6, the output controller 146 has changed the evaluation result objects Mu in the first display form (the circular shape, for example) to the evaluation result objects Mu in the second display form (the shape with the sharp contour, for example). The timing at which the evaluation result objects Mu are changed is not particularly limited. For example, the evaluation result of the likelihood of speech may be reflected to the evaluation result objects Mu in an order of calculation.

As described above, the evaluation result objects Mu may be changed on the basis of at least one of the shape, the transparency, the color, the size, and the motion of the evaluation result objects Mu. Here, an example of change in the evaluation result objects Mu will be described by exemplifying the shape, the transparency, and the motion of the evaluation result objects Mu.

Figure 10:
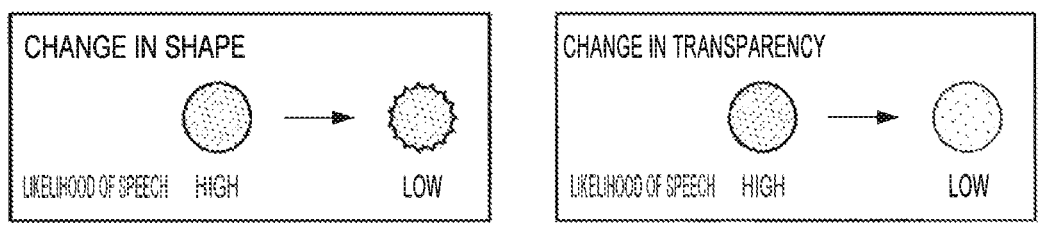
FIG. 10 is a diagram illustrating an example of two evaluation result objects with different shapes and transparency.

FIG. 10 is a diagram illustrating an example of two evaluation result objects Mu with different shapes and transparency. As illustrated in FIG. 10, the output controller 146 may change the shape of the evaluation result objects Mu in accordance with the evaluation result of the likelihood of speech when the shape of the evaluation result objects Mu is changed. As illustrated in FIG. 10, for example, the output controller 146 may increase a degree of sharpness of the contour of the evaluation result objects Mu or increase the number of sharpened portions of the contour as the likelihood of speech decreases.

As illustrated in FIG. 10, the output controller 146 may change the transparency of the evaluation result objects Mu in accordance with the evaluation result of the likelihood of speech when the transparency of the evaluation result objects Mu is changed. As illustrated in FIG. 10, for example, the output controller 146 may increase the transparency of the evaluation result objects Mu as the likelihood of speech decreases. Also, the output controller 146 may change the motion of the evaluation result objects Mu in accordance with the evaluation result of the likelihood of speech when the motion of the evaluation result objects Mu is changed.

FIG. 11 is a diagram illustrating an example of two evaluation result objects Mu with different motion. As illustrated in FIG. 11, the output controller 146 may change the motion of the evaluation result objects Mu in accordance with the evaluation result of the likelihood of speech when the motion of the evaluation result objects Mu is changed. As illustrated in FIG. 11, for example, the output controller 146 may move (moving direction De) the evaluation result objects Mu to a predetermined target position (to the speech recognition processing start operation object G14, for example) when the likelihood of speech is greater than the threshold value.

In contrast, the output controller 146 may not move the evaluation result objects Mu to the predetermined target position (to the speech recognition processing start operation object G14, for example) (a moving direction De1 and a moving direction De2) when the likelihood of speech is less than the threshold value. The evaluation result objects Mu that move to the target position as described above can correspond to collected sound information from which noise has been removed by execution of noise removal processing, and the evaluation result objects Mu that do not move to the target position can correspond to the noise of the collected sound information. Therefore, it is possible to allow the user to recognize whether or not the noise removal processing has been executed.

The example in which the output controller 146 did not move the evaluation result objects Mu to the predetermined target position (to the speech recognition processing start operation object G14, for example) when the likelihood of speech is less than the threshold value was described. However, the output controller 146 may employ a method other than the method of changing a track of the evaluation result objects Mu when the likelihood of speech is less than the threshold value. For example, the output controller 146 may add animation representing that the evaluation result objects Mu are rebound at the predetermined target position (the speech recognition processing start operation object G14, for example) to the evaluation result objects Mu when the likelihood of speech is less than the threshold value.

Figure 12:
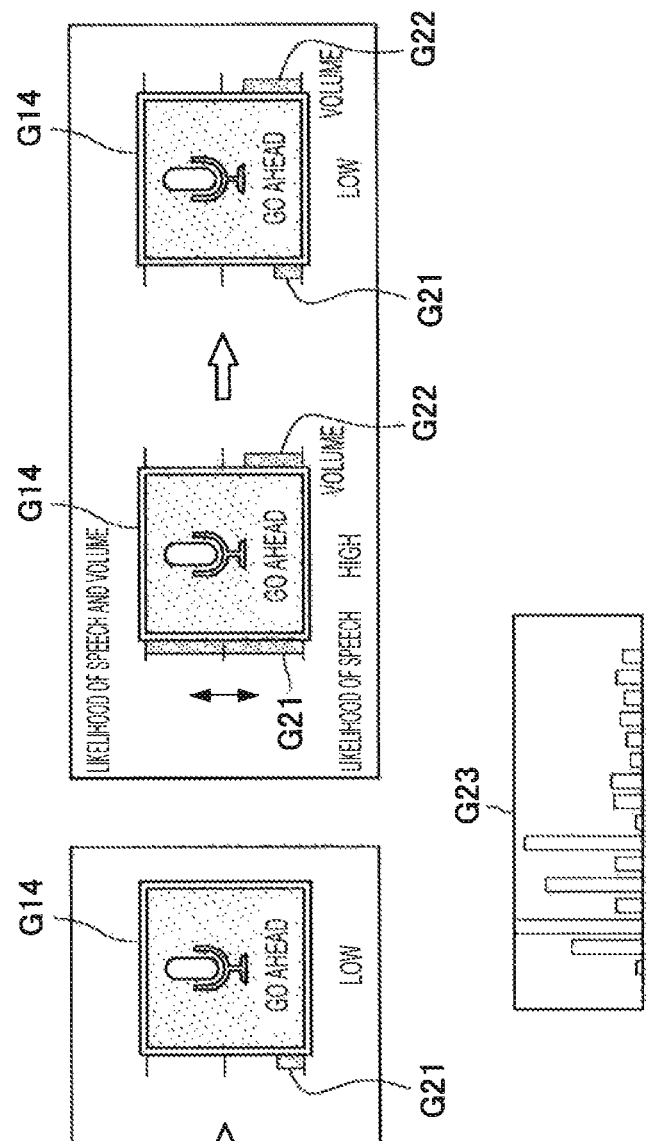
FIG. 12 is a diagram illustrating an example of an output of the evaluation result of likelihood of speech.

Other methods can also be assumed as a method of outputting the evaluation result of the likelihood of speech. FIG. 12 is a diagram illustrating an example of an output of the evaluation result of the likelihood of speech. For example, the output controller 146 may cause the color of the speech recognition processing start operation object G14 to differ when the evaluation result of the likelihood of speech is less than the threshold value and when the evaluation result of the likelihood of speech is greater than the threshold value. The output controller 146 may cause a speech recognition processing start operation object G14# with no color to be displayed when the evaluation result of the likelihood of speech is greater than the threshold value as illustrated in "icon display".

In contrast, the output controller 146 may cause the speech recognition processing start operation object G14 with a color to be displayed when the evaluation result of the likelihood of speech is less than the threshold value. Since the evaluation result of the likelihood of speech is expressed as successive values, the color of the speech recognition processing start operation object G14 may be successively changed. For example, the output controller 146 may display an indicator G21 as illustrated in FIG. 12.

In contrast, the output controller 146 may cause the speech recognition processing start operation object G14 to be displayed. Since the evaluation result of the likelihood of speech is expressed as successive values, the color of the speech recognition processing start operation object C14 may be successively changed. For example, the output controller 146 may display the indicator G21 and an indicator G22 as illustrated in FIG. 12. The indicator G22 may indicate the volume of the collected sound information unlike the indicator G21. The user can be guided to utterance that can easily be recognized by the speech recognition processing by learning what kind of utterance increases the likelihood of speech in a try and error manner while viewing the display of the indicator.

The example in which the output controller 146 caused both the indicator G21 and G22 to be displayed was described above. However, parts to be displayed are not limited to the indicator G21 and G22. For example, the output controller 146 can also switch the indicator 21 and the indicator G22 to feedback such as an equalizer when a parameter of the collected sound information has increased.

The output controller 146 may cause the output portion 130 to output the threshold value. The threshold value may be expressed in any way. When the evaluation result of the likelihood of speech is expressed with colors, for example, the threshold value may be expressed with an intermediate color of each color that the evaluation result of the likelihood of speech shows. When the evaluation result of the likelihood of speech is expressed with an indicator, the threshold value may be expressed with a bar provided at a corresponding position.

Figure 13:
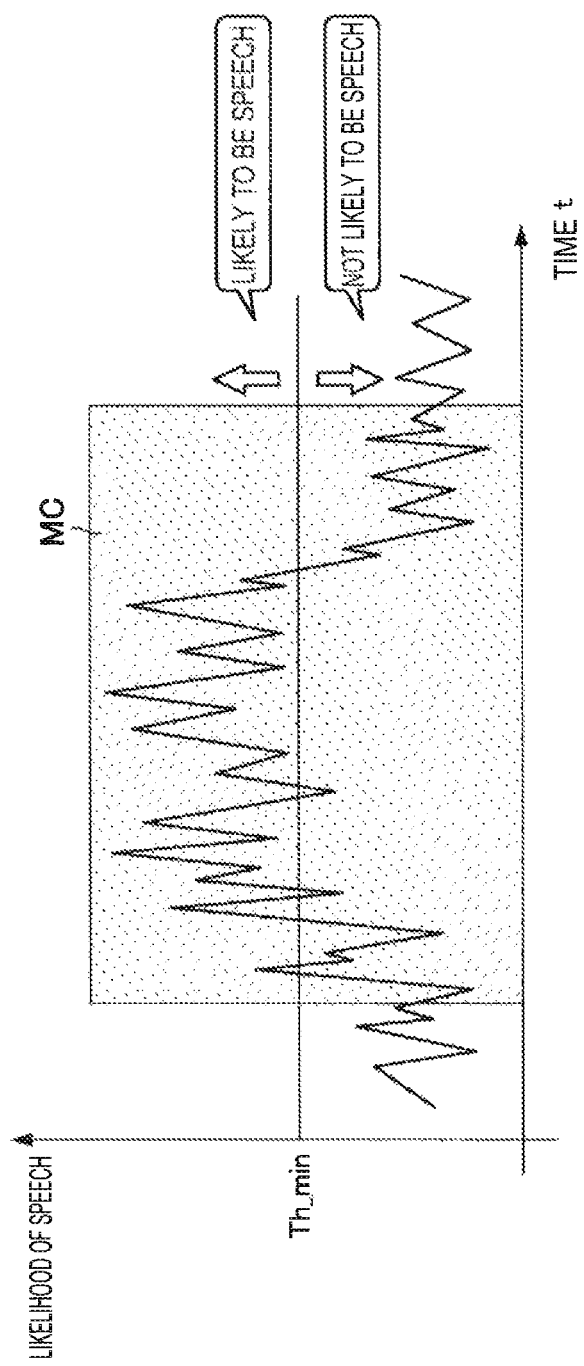
FIG. 13 is a diagram illustrating a state in which the likelihood of speech of the collected sound information changes with elapse of time.

Next, a case where the evaluation result of the likelihood of speech and the threshold value are compared will be described in detail. FIG. 13 is a diagram illustrating a state where the likelihood of speech of the collected sound information changes with elapse of time. MC illustrated in FIG. 13 is a region where the microphone is turned on. It is assumed that the likelihood of speech of the collected sound information changes as illustrated in FIG. 13. At this time, a region where the likelihood of speech is greater than a threshold value (Th_min) corresponds to a region that is likely to correspond to speech. In contrast, a region where the likelihood of speech is less than the threshold value is (Th_min) likely to correspond to a region that is not likely to correspond to speech.

The threshold value (Th_min) may be determined in advance or may be dynamically changed in the course of the operation of the information processing system 10. Although the likelihood of speech may be expressed by non-successive values, successive values may be directly used as the likelihood of speech when the evaluation result of the likelihood of speech is obtained as successive values. The example in which it was determined whether or not the collected sound information was likely to be speech by using one threshold value was described herein. However, a plurality of threshold values may be used.

Figure 14:
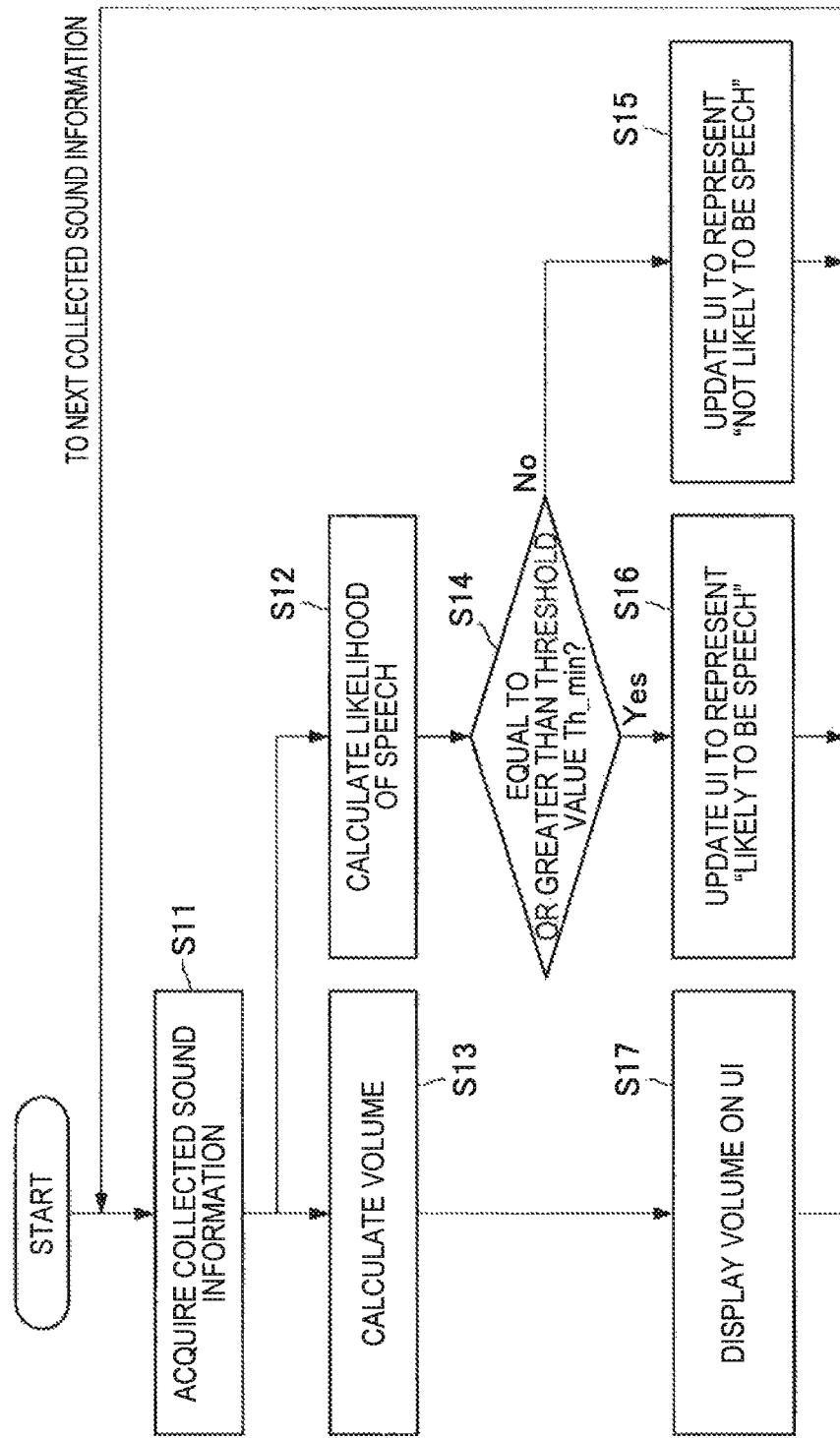
FIG. 14 is a flowchart illustrating an example of a flow of operations performed by the information processing system when the likelihood of speech is determined using the threshold value.

Next, a flow of operations performed by the information processing system 10 when the likelihood of speech is determined by using the threshold value will be described. FIG. 14 is a flowchart illustrating an example of a flow of operations performed by the information processing system 10 when the likelihood of speech is determined by using the threshold value. Since the flowchart of FIG. 14 illustrates only a flow of operations performed by the information processing system 10 when the likelihood of speech is determined by using the threshold value, the flow of operations performed by the information processing system 10 when the likelihood of speech is determined by using the threshold value is not limited to the example illustrated in FIG. 14.

First, the collected sound information acquisition portion 142 acquires collected sound information collected by the sound collecting portion 120 (S11). Next, the output controller 146 calculates a volume from the collected sound information (S13), cause the UI (screen) to display the volume (S17), and moves on to the operation in S11. In contrast, the output controller 146 calculates the likelihood of speech from the collected sound information (S12), and if the likelihood of speech is equal to or greater than the threshold value Th_min ("Yes" in S14), updates the UI (screen) so as to represent that the collected sound information is likely to be speech (S16), and moves on to the operation in S11.

In contrast, if the likelihood of speech does not exceed the threshold value Th_min ("No" in S14), the output controller 146 updates the UI (screen) so as to represent that the collected sound information is not likely to be speech (S15), and moves on to the operation in S11. The flow of the operation performed by the information processing system 10 when the likelihood of speech was determined by using the threshold value was described hitherto.

[1.4. Modification Example When Utterance Ends]

Next, a modification example when utterance ends will be described. Termination of a part serving as a target of the speech recognition processing may be determined in any way. In example, the recognition controller 144 may detect whether or not there is a part in which a volume is continuously less than a predetermined volume for a period of time that is less than a predetermined volume (hereinafter, also simply referred to as a "silent part") in the collected sound information, and determine the termination of the part serving as the target of the speech recognition processing on the basis of the timing at which the silent part is detected. For example, the timing at which the silent part is detected may be determined as the termination of the part serving as the target of the speech recognition processing. However, it becomes difficult to detect the silent part due to presence of noise even after the user completes utterance in some cases. Such an example will be described.

Figure 15:
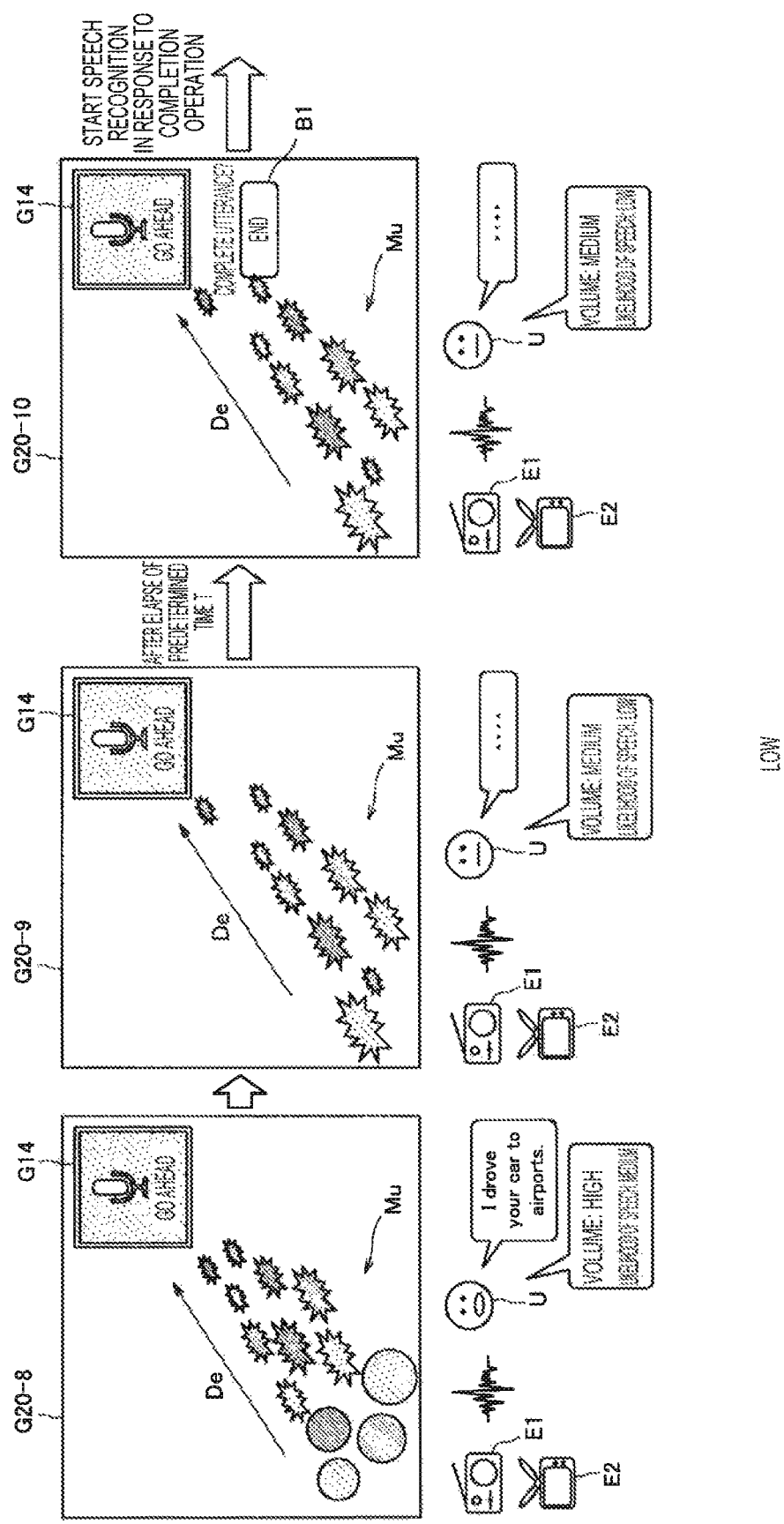
FIG. 15 is a diagram illustrating an example of screen display when an utterance ends.

FIG. 15 is a diagram illustrating an example of screen display when utterance ends. As illustrated as a screen G20-8, there is a possibility that no silent part is detected as illustrated as a screen G20-9 even after the user completes utterance when the user produces utterance in an environment with noise as illustrated as the screen G20-8. If no silent part is detected, the termination of the part serving as the target of the speech recognition processing is not determined. Also, there is also a case in which the operation does not move on to speech analysis if no silent part is detected. Thus, the recognition controller 144 may add or change a condition for determining the termination of the part serving as the target of the speech recognition processing when the evaluation result of the likelihood of speech is less than the threshold value after the utterance by the user and when the volume of the collected sound information is greater than the predetermined volume.

Since the volume is "medium" and the likelihood of speech is "low" in the example illustrated as a screen 20-10, a case in which the recognition controller 144 has determined that the evaluation result of the likelihood of speech is less than the threshold value and that the volume of the collected sound information is greater than the predetermined volume will be assumed. In such a case, the output controller 146 preferably causes a message for asking whether or not the speech recognition processing is to be ended (for example, "Complete utterance?") to be displayed and cause an utterance completion operation object B1 for determining termination of the part serving as the target of the speech recognition processing to be displayed. The recognition controller 144 may determine the termination of the part serving as the target of the speech recognition processing by the user performing an operation of selecting the utterance completion operation object B1.

Figure 16:
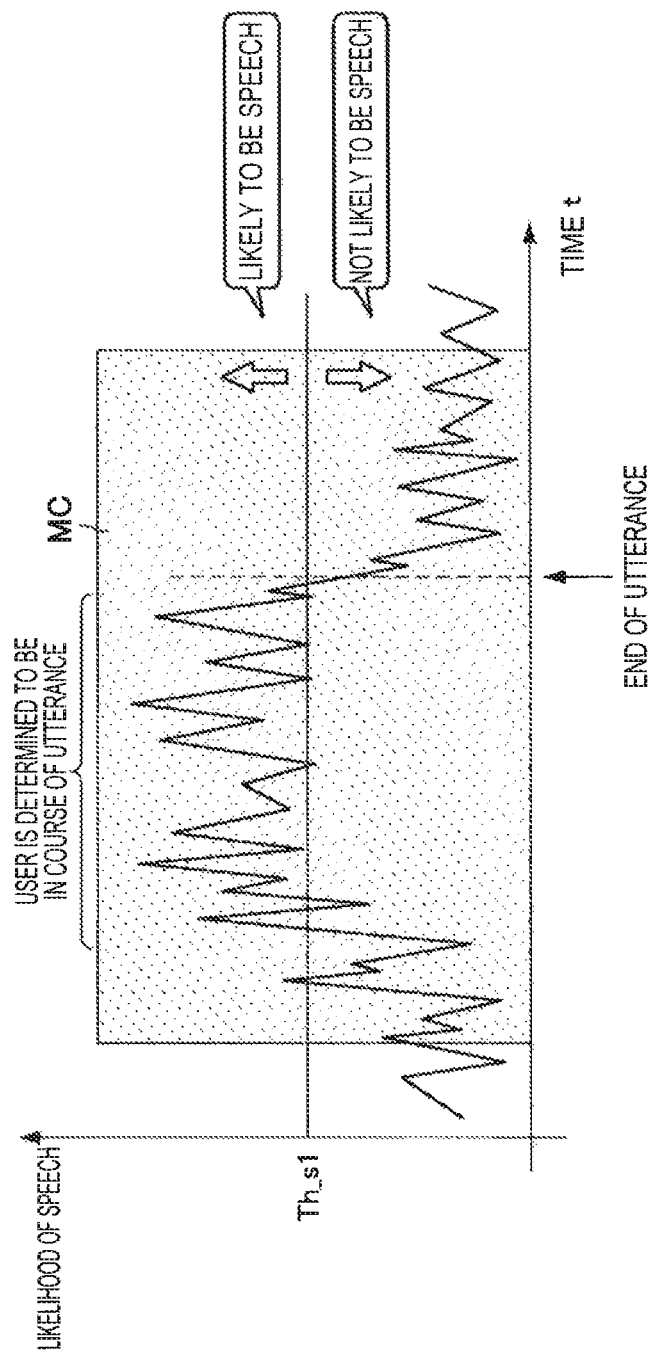
FIG. 16 is a diagram illustrating an example of a temporal change in the likelihood of speech when it is determined whether or not the collected sound information is likely to be speech using the threshold value.
Figure 17:
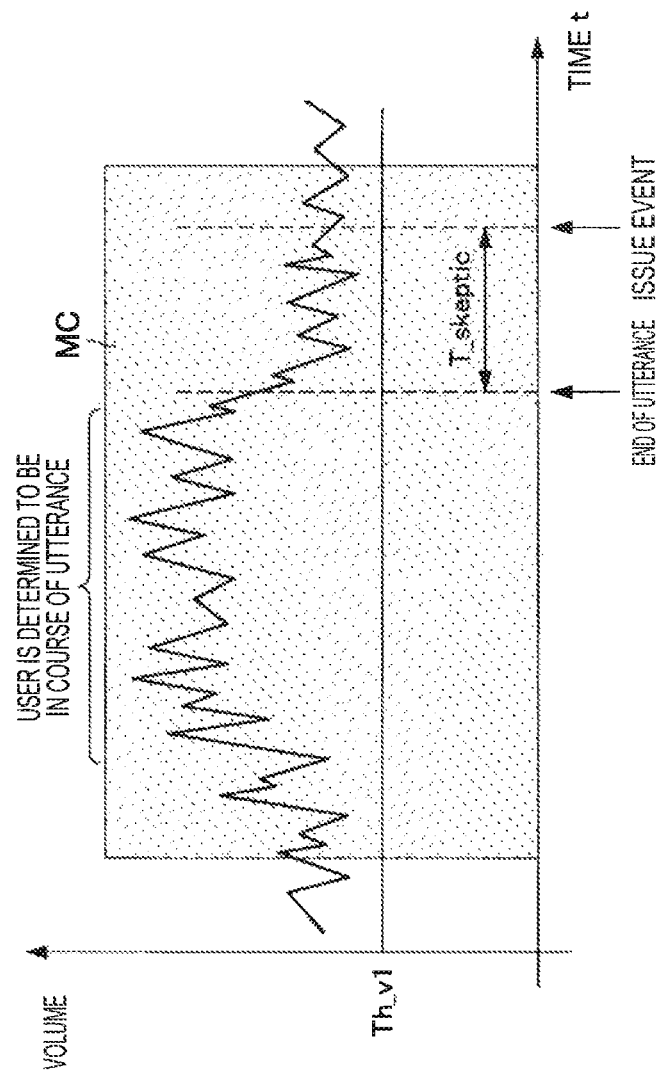
FIG. 17 is a diagram illustrating an example of a temporal change in a volume when a silent part is detected using a threshold value.

Description will be continued while discussing specific changes in the likelihood of speech and the volume. FIG. 16 is a diagram illustrating an example of a temporal change in the likelihood of speech when it is determined whether or not the collected sound information is likely to be speech by using a threshold value. FIG. 17 is a diagram illustrating an example of a temporal change in the volume when the silent part is detected by using a threshold value. In FIG. 16, Th_s1 is a threshold value for determining whether or not the collected sound information is likely to be speech. In FIG. 17, Th_v is a threshold value for detecting the silent part.

Referring to FIG. 16, the likelihood of speech decreases after utterance by the user. However, referring to FIG. 17, the volume decreases as compared with that during the utterance but is not low enough to detect the silent part during a predetermined period of time (T_skeptic). That is, the output controller 146 determines that the evaluation result of the likelihood of speech is less than the threshold value (Th_s1) and that the volume of the collected sound information is greater than the predetermined volume and issues an event E_skeptic indicating that there is a possibility that the utterance by the user has been completed.

If the event is issued, an application receives the event, causes a message for asking whether or not the speech recognition processing is to be ended to be displayed, and causes the utterance completion operation object B1 for determining the termination of the part serving as the target of the speech recognition processing to be displayed. FIG. 18 is a diagram illustrating an example of processing corresponding to combinations between the likelihood of speech and the volume when utterance ends. When the likelihood of speech is greater than the threshold value and the volume is greater than the threshold value as illustrated in FIG. 18, there is a possibility that the user is in the course of utterance.

When the likelihood of speech is greater than the threshold value and the volume is less than the threshold value, there is a possibility that the user has uttered with an insufficient volume (there is a possibility that the detection of the silent part is executed). When the likelihood of speech is less than the threshold value and the volume is high, the environment where the user is present is an environment with noise, and there is a possibility that the event E_skeptic is issued. When the likelihood of speech is less than the threshold value and the volume is less than the threshold value, there is a possibility that the user has completed utterance (there is a possibility that the silent part is detected).

Figure 19:
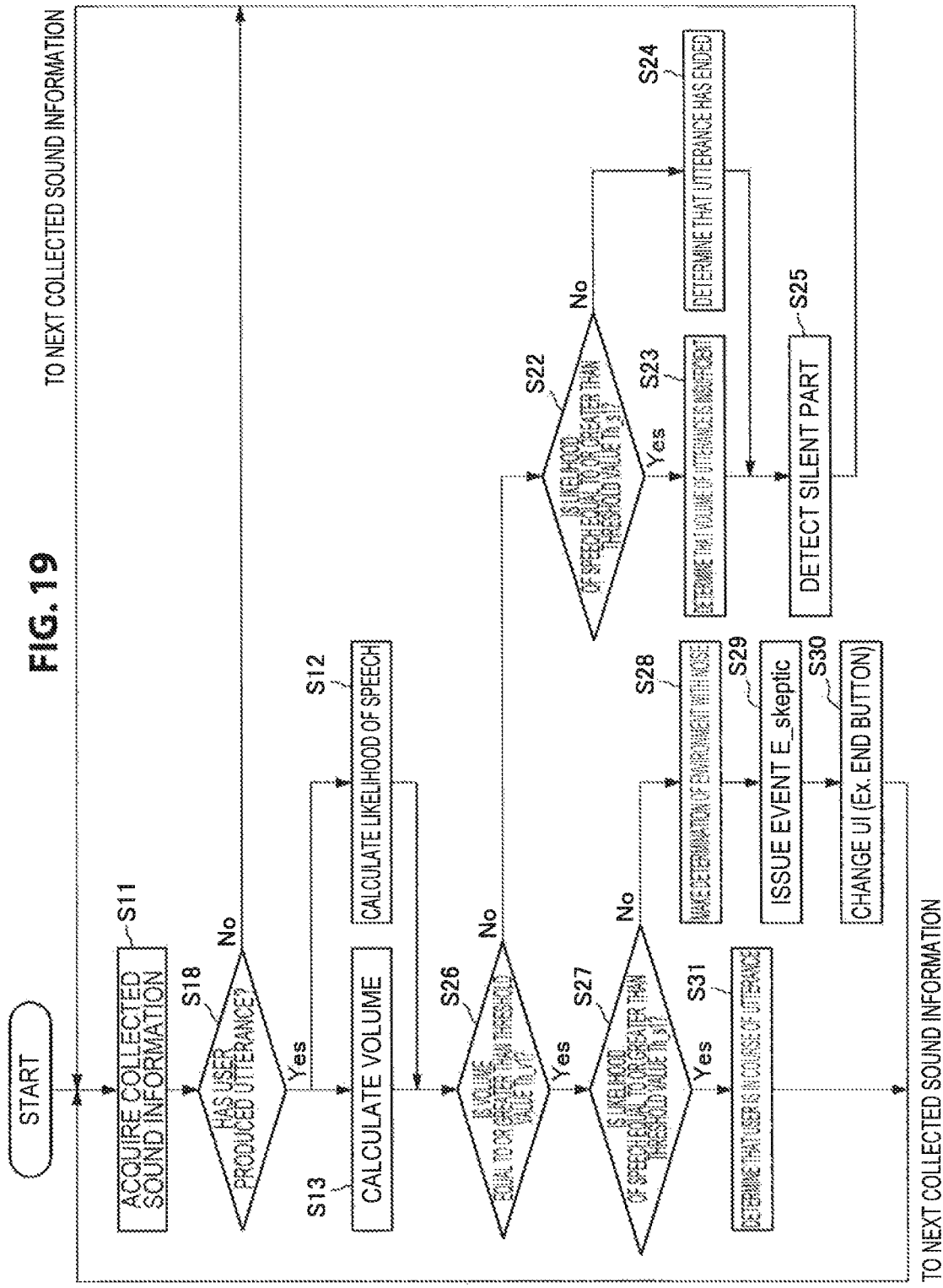
FIG. 19 is a flowchart illustrating an example of a flow of operations performed by the information processing system, in which a sequence when an utterance ends is changed.

Next, a flow of operations performed by the information processing system 10, in which a sequence when utterance ends is changed, will be described. FIG. 19 is a flowchart illustrating an example of a flow of operations performed by the information processing system, in which a sequence when utterance ends is changed. Since the flowchart of FIG. 19 illustrates only an example of a flow of operations performed by the information processing system 10, in which the sequence when utterance ends is changed, the flow of operations performed by the information processing system 10, in which the sequence when the utterance ends is changed, is not limited to the example illustrated in the flowchart of FIG. 19.

First, the collected sound information acquisition portion 142 acquires collected sound information collected by the sound collecting portion 120 (S11). Then, the output controller 146 moves on to the operation in S11 when there is no utterance by the user ("No" in S18). In contrast, if there is an utterance by the user ("Yes" in S18), the output controller 146 calculates the likelihood of speech and the volume from the collected sound information (S12, S13) and moves on to the operation in S26. The output controller 146 moves on to the operation in S27 when the volume is equal to or greater than a threshold value Th_v1 ("Yes" in S26), or moves on to the operation in S22 when the volume is less than the threshold value Th_v1 ("No" in S26).

The output controller 146 determine that the user is in the course of utterance (S31) when the likelihood of speech is equal to or greater than the threshold value Th_s1 ("Yes" in S27), and moves on to the operation in S11. In contrast, the output controller 146 determines that the environment where the user is present is an environment with noise (S28) when the likelihood of speech is less than the threshold value Th_s1 ("No" in S27), issues an event (E_skeptic), changes the UI (screen) (display of an end button, for example) (S30), and moves on to the operation in S11.

The output controller 146 determines that the volume of the utterance is insufficient (S23) when the likelihood of speech is equal to or greater than the threshold value Th_s1 ("Yes" in S22), but detects a silent part (S25), and moves on to the operation in S11. In contrast, the output controller 146 determines that the utterance has ended (S24) when the likelihood of speech is less than the threshold value Th_s1 ("No" in S22), detects the silent part (S25), and moves on to the operation in S11. The flow of the operations performed by the information processing system 10, in which the sequence when the utterance ends was changed, was described hitherto.

[1.5. Modification Example When Utterance Starts]

Figure 20:
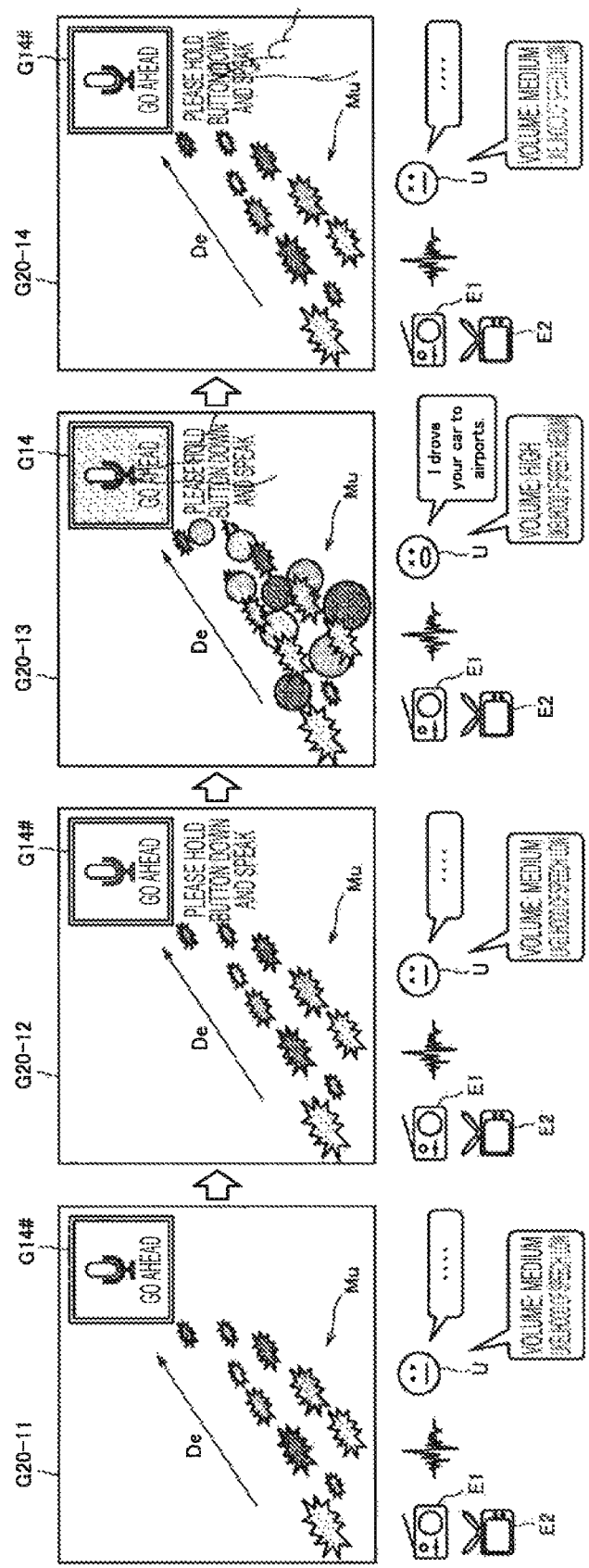
FIG. 20 is a diagram illustrating an example of screen display when an utterance starts.

Next, a modification example when utterance starts will be described. FIG. 20 is a diagram illustrating an example of screen display when utterance starts. When the user is present in an environment with noise when the utterance starts as illustrated as a screen 20-11, it is difficult to detect the silent part. However, it is assumed that the user is present in the environment with noise when the utterance starts. Therefore, the recognition controller 144 preferably add or change the condition for determining the termination of the part serving as the target of the speech recognition processing when the volume of the collected sound information is greater than the predetermined volume before the user produces utterance. A specific example will be described below. Referring to the screen G20-11, the noise in the environment where the user is present increases before the utterance (or immediately after the start of the utterance). At this time, the evaluation result objects Mu may not be displayed.

When a screen G20-12 is being displayed, the recognition controller 144 determines that the volume of the collected sound information is greater than the predetermined volume. Since it is difficult to detect the silent part in this case, the recognition controller 144 switches an input scheme to a Push To Talk (PTT) scheme, In the PTT scheme, sound is collected until the user completes to press the speech recognition processing start operation object G14 after the user starts to press the object (screen G20-13, screen 20-14). In this manner, the termination of the part serving as the target of the speech recognition processing can be determined by the operation of completing to press the speech recognition processing start operation object G14 even if no silent part is detected.

FIG. 21 is a diagram illustrating an example of processing corresponding to combinations between likelihood of speech and a volume when the utterance ends. When the likelihood of speech is greater than the threshold value as illustrated in FIG. 21 and the volume is greater than the threshold value, there is considered to be a possibility that the user is in the course of utterance. When the likelihood of speech is greater than the threshold value and the volume is less than the threshold value, there is a possibility that the user is present in an environment where the silent part can be detected (there is a possibility that the user speaks with small voice).

When the likelihood of speech is less than the threshold value and the volume is high, the environment where the user is present is an environment with noise, the input method is changed to the PTT. When the likelihood of speech is less than the threshold value and the volume is less than the threshold value, there is a possibility that the user is present in an ordinary environment (quiet environment).

Figure 22:
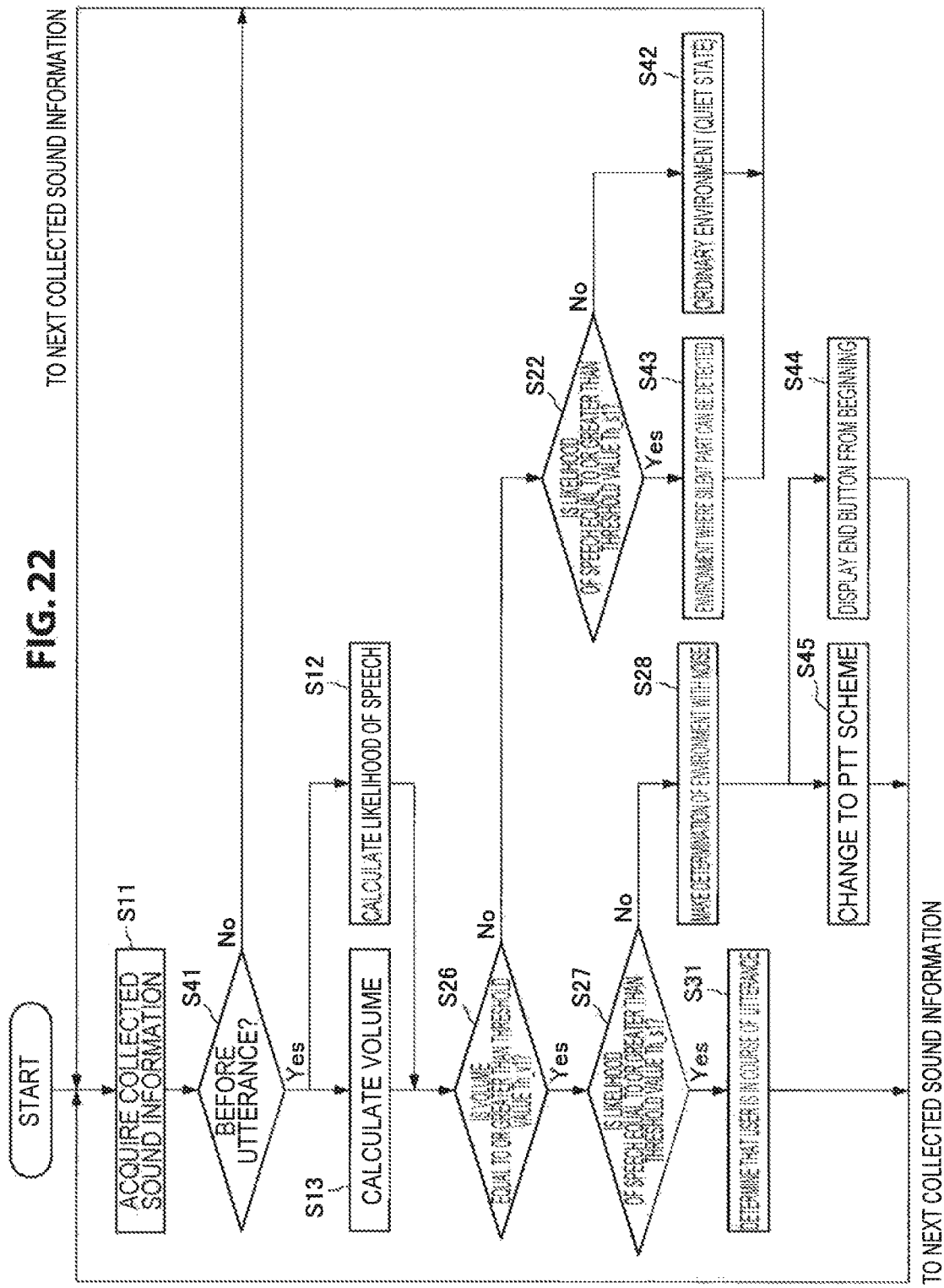
FIG. 22 is a flowchart illustrating an example of a flow of operations performed by the information processing system 10, in which a sequence when an utterance starts is changed.

Next, a flow of operations performed by the information processing system 10, in which a sequence when utterance starts is changed, will be described. FIG. 22 is a flowchart illustrating an example of a flow of operations performed by the information processing system 10, in which the sequence when utterance starts is changed. Since the flowchart of FIG. 22 illustrates only an example of a flow of operations performed by the information processing system 10, in which the sequence when the utterance starts is changed, the flow of the operations performed by the information processing system 10, in which the sequence when the utterance starts is changed, is not limited to the example illustrated in the flowchart of FIG. 22.

First, the collected sound information acquisition portion 142 acquires collected sound information collected by the sound collecting portion 120 (S11). Then, the output controller 146 moves on to the operation in S11 in a case of not before utterance by the user ("No" in S41). In contrast, the output controller 146 calculates the likelihood of speech and the volume from the collected sound information (S12, S13) in a case before the utterance by the user ("Yes" in S41), and moves on to the operation in S26. The output controller 146 moves on to the operation in S27 when the volume is equal to or greater than the threshold value Th_v1 ("Yes" in S26), or moves on to the operation in S22 when the volume is less than the threshold value Th_v1 ("No" in S26).

The output controller 146 determines that the user is in the course of utterance (S31) when the likelihood of speech is equal to or greater than the threshold value Th_s1 ("Yes" in S27), and moves on to the operation in S11. In contrast, the output controller 146 determines that the environment where the user is present is an environment with noise (S28) and that the user is present in an environment with noise (S28) when the likelihood of speech is less than the threshold value Th_s1 ("No" in S27), causes the end button to be displayed from the beginning (S44), changes the input scheme to the PTT scheme (S45), and moves on to the operation in S11.

The output controller 146 determines that the user is present in an environment where the silent part can be detected (S43) when the likelihood of speech is equal to or greater than the threshold value Th_s1 ("Yes" in S22), and moves on to the operation in S11. In contrast, the output controller 146 determines that the user is present in an ordinary environment (quiet environment) (S42) when the likelihood of speech is less than the threshold value Th_s1 ("No" in S22), and moves on to the operation in S11. The flow of the operations performed by the information processing system 10, in which the sequence when the utterance starts was changed, was described hitherto.

[1.6. Modified Example of Display Form]

Figure 23:
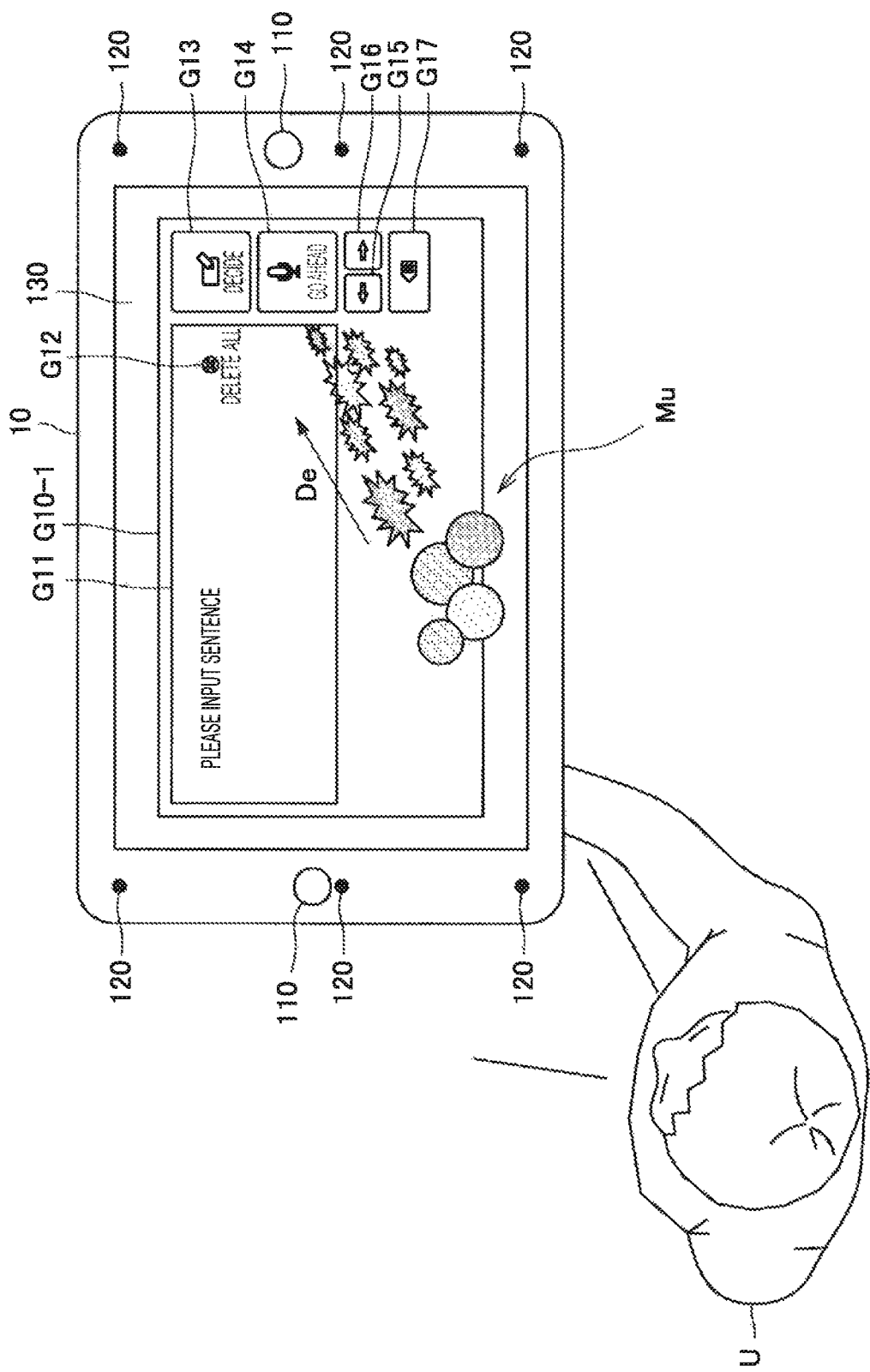
FIG. 23 is a diagram illustrating a modification example of a display form of an output portion.

The above description is given as to the example in which the output portion 130 is a projector capable of projecting a screen onto the top surface of the table Tb1. However, the display form of the output portion 130 is not limited to this example. Hereinafter, a modification example of the display form of the output portion 130 will be described. FIG. 23 is a diagram illustrating a modified example of the display form of the output portion 130. As illustrated in FIG. 23, in the case where the information processing system 10 is a mobile terminal, the output portion 130 may be provided in the mobile terminal. The type of the mobile terminal is not limited to a particular type, and it may be a tablet terminal, a smartphone, or a cellular phone.

[1.7. Other Modification Examples]

Next, other modification examples will be described. The example in which the evaluation result of the likelihood of speech was output was described above. However, the recognition controller 144 may control whether or not to cause speech recognition processing to be executed in accordance with a relationship between the likelihood of speech and a threshold value. For example, when the evaluation result is greater than a threshold value, the recognition controller 144 may cause speech recognition processing on the collected sound information to be performed. In contrast, when the evaluation result is less than a threshold value, the recognition controller 144 may not cause speech recognition processing on the collected sound information to be performed.

The example in which the termination of the part serving as the target of the speech recognition processing was determined on the basis of both the likelihood of speech and the volume was described above. However, the recognition controller 144 may determine the termination of the part serving as the target of the speech recognition processing on the basis of at least either of the likelihood of speech and the volume. For example, the recognition controller 144 may determine the termination of the part serving as the target of the speech recognition on the basis of timing when a period of time during which the evaluation result is less than the threshold value is greater than a predetermined period of time in the collected sound information. More specifically, the recognition controller 144 may determine, as the termination of the part serving as the target of the speech recognition processing, the timing when the period of time during which the evaluation result is less than the threshold value is greater than the predetermined period of time in the collected sound information.

Also, the example in which the likelihood of speech was evaluated for the collected sound information was described above. However, other evaluation for the collected sound information may be additionally performed. In such a case, two kinds of evaluation may be used. For example, the output controller 146 may cause the output portion 130 to output different evaluation result objects when a first evaluation result obtained by evaluating the likelihood of speech of the collected sound information is greater than a first threshold value and when a predetermined second evaluation result of the collected sound information is greater than a second threshold value. The evaluation result object for the likelihood of speech may be an icon of a mouth. The second evaluation may be performed by the output controller 146 or a server in the same manner as in the speech recognition processing.

Here, the second evaluation result may include an evaluation result that is obtained by evaluating likelihood of music of the collected sound information. The evaluation result object for the likelihood of music may be an icon of a music note. Although a method of evaluating the likelihood of music from the collected sound information is not particularly limited, a method described in a patent literature (JP 2010-38943A) can also be employed. The second evaluation result may include an evaluation result obtained by evaluating likelihood of humming or may include an evaluation result obtained by evaluating likelihood of TV sound.

The recognition controller 144 may cause first sound recognition processing (speech recognition processing, for example) based on the collected sound information to be performed when the first evaluation result (the likelihood of speech, for example) regarding a type of sound based on the collected sound information is greater than the first threshold value, and may cause second sound recognition processing (music recognition processing, for example) based on the collected sound information to be performed when the predetermined second evaluation result (the likelihood of music, for example) of the collected sound information is greater than the second threshold value. The music recognition processing may be processing of recognizing information related to a musical piece (a song title, a name of a singer, and the like) from the collected sound information.

The output controller 146 may determine the evaluation result object to be output from the output portion 130 on the basis of a history of the evaluation result. This enables the evaluation result object to be prevented from flickering even when the evaluation result of the likelihood of speech often crosses the threshold value. More specifically, the output controller 146 may determine the evaluation result object to be output from the output portion 130 on the basis of an average value of the evaluation result for a predetermined period of time.

Alternatively, the output controller 146 may determine the evaluation result object to be output from the output portion 130 on the basis of frequency at which the evaluation result crosses the threshold value for a predetermined period of time. For example, the output controller 146 may correct the evaluation result so as to reduce variations thereof as the frequency at which the evaluation result crosses the threshold value for the predetermined period of time increases. The output controller 146 may correct the threshold value itself on the basis of the evaluation result for the predetermined period of time.

Other modification examples were described hitherto.

[1.8. Hardware Configuration Example]

Figure 24:
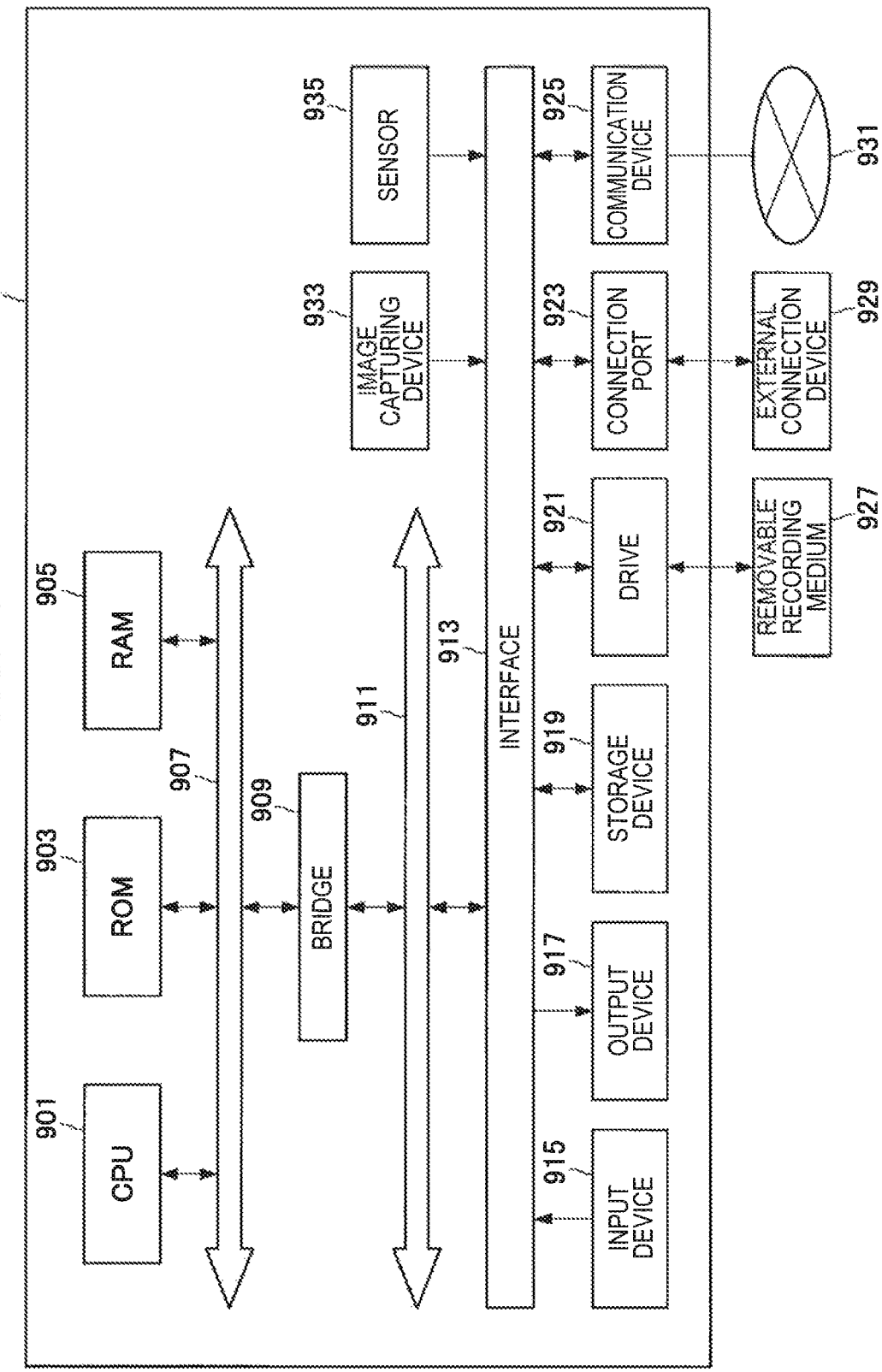
FIG. 24 is a block diagram illustrating a hardware configuration example of the information processing system.

Next, the hardware configuration of the information processing system 10 according to an embodiment of the present disclosure is described with reference to FIG. 24. FIG. 24 is a block diagram illustrating a hardware configuration example of the information processing system 10 according to an embodiment of the present disclosure.

As illustrated in FIG. 24, the information processing system 10 includes a central processing unit (CPU) 901, a read only memory (ROM) 903, and a random access memory (RAM) 905. In addition, the information processing system 10 may include a host bus 907, a bridge 909, an external bus 911, an interface 913, an input device 915, an output device 917, a storage device 919, a drive 921, a connection port 923, and a communication device 925. The information processing system 10 may further include an image capturing device 933 and a sensor 935 as necessary. In conjunction with, or in place of, the CPU 901, the information processing system 10 may have a processing circuit called a digital signal processor (DSP) or application specific integrated circuit (ASIC).

The CPU 901 functions as an arithmetic processing unit and a control device, and controls the overall operation in the information processing system 10 or a part thereof in accordance with various programs recorded in the ROM 903, the RAM 905, the storage device 919, or the removable recording medium 927. The ROM 903 stores, for example, programs and operation parameters used by the CPU 901. The RAM 905 temporarily stores, for example, programs to be used in the execution by the CPU 901 and parameters that change as appropriate in executing the programs. The CPU 901, the ROM 903, and the RAM 905 are connected with each other via a host bus 907 that is composed of an internal bus such as a CPU bus. Furthermore, the host bus 907 is connected to an external bus 911 such as peripheral component interconnect (PCI)/interface bus via a bridge 909.

The input device 915 is, for example, a device operated by a user, such as a mouse, a keyboard, a touch panel, a button, a switch, and a lever. The input device 915 may include a microphone for detecting user's voice. The input device 915 may be, for example, a remote control device using infrared rays or other radio waves, or may be an external connection device 929 such as a cellular phone conforming to the operation of the information processing system 10. The input device 915 includes an input control circuit that generates an input signal on the basis of the information input by the user and outputs it to the CPU 901. The user inputs various data to the information processing system 10 and instructs the information processing system 10 to perform a processing operation by operating the input device 915. In addition, the image capturing device 933, which will be described later, can also function as an input device by capturing the movement of the user's hand or finger, and the like. In this case, the pointing position may be determined depending on the motion of the hand or the orientation of the finger.

The output device 917 is composed of a device capable of notifying visually or audibly the user of the acquired information. The output device 917 may be a display device such as a liquid crystal display (LCD), a plasma display panel (PDP), an organic electro-luminescence (EL) display, and a projector, a hologram display device, an audio output device such as a speaker and a headphone, as well as printer devices or the like. The output device 917 outputs the result obtained by the processing of the information processing system 10 as a video such as a text or an image, or outputs it as audio such as a voice or sound. In addition, the output device 917 may include, for example, a light for lighting up the surroundings.

The storage device 919 is a data storage device configured as an example of a storage portion of the information processing system 10. The storage device 919 is composed of, for example, a magnetic storage device such as hard disk drives (HDDs), a semiconductor storage device, an optical storage device, and a magneto-optical storage device. The storage device 919 stores programs executed by the CPU 901, various data, various types of data obtained from the outside, and the like.

The drive 921 is a reader-writer for a removable recording medium 927 such as a magnetic disk, an optical disk, a magneto-optical disk, and a semiconductor memory, and is incorporated in the information processing system 10 or externally attached thereto. The drive 921 reads the information recorded in the attached removable recording medium 927 and outputs it to the RAM 905. In addition, the drive 921 writes in the attached removable recording medium 927.

The connection port 923 is a port for directly connecting the device to the information processing system 10. The connection port 923 may be, for example, a universal serial bus (USB) port, an IEEE 1394 port, or a small computer system interface (SCSI) port. In addition, the connection port 923 may be, for example, an RS-232C port, an optical audio terminal, or high-definition multimedia interface (HDMI, registered trademark) port. The external connection device 929 is connected to the connection port 923, and thus various kinds of data can be exchanged between the information processing system 10 and the external connection device 929.

The communication device 925 is, for example, a communication interface composed of a communication device or the like, which is used to be connected to the communication network 931. The communication device 925 may be, for example, a communication card for wired or wireless local area network (LAN), Bluetooth (registered trademark), or wireless USB (WUSB). In addition, the communication device 925 may be, for example, a router for optical communication, a router for asymmetric digital subscriber line (ADSL), or a modem for various communications. The communication device 925 transmits and receives signals or the like using a predetermined protocol such as TCP/IP, for example, with the Internet or other communication devices. In addition, the communication network 931 connected to the communication device 925 is a network connected by wire or wireless, and is, for example, the Internet, home LAN, infrared communication, radio wave communication, satellite communication, or the like.

The image capturing device 933 captures a real space and generates a captured image, by using an image sensor such as charge-coupled device (CCD) or complementary-metal-oxide semiconductor (CMOS) and various members such as a lens for controlling imaging of a subject image on the image sensor. The image capturing device 933 may capture a still image or a moving image.

The sensor 935 is, for example, various sensors such as an accelerometer, a gyro sensor, a geomagnetic sensor, a photosensor, and a sound sensor. The sensor 935 acquires information on the state of the information processing system 10 itself, such as the attitude of the casing of the information processing system 10, and information on the surrounding environment of the information processing system 10 such as brightness or noise around the information processing system 10. The sensor 935 may also include a GPS sensor, which receives global positioning system (GPS) signals and measures the latitude, longitude, and altitude of the device.

The above description is given as to the example of the hardware configuration of the information processing system 10. Each of the components described above may be configured using a general-purpose member, or may be configured with hardware dedicated to the function of each component. Such a configuration can be changed appropriately depending on the technical level at the time of implementation.

2. <Conclusion>

According to the embodiment of the present disclosure, the information processing device 140, which includes the recognition controller 144 that causes the speech recognition processing portion 145 to execute sound recognition processing based on the collected sound information obtained by the sound collecting portion 120, and the output controller 146 that generates an output signal for outputting a recognition result obtained by the sound recognition processing, in which the output controller 146 causes the output portion to output an evaluation result regarding a type of sound based on the collected sound information before the recognition result, is provided as described above. With such a configuration, it is possible for the user to adjust utterance by recognizing the evaluation result regarding the type of sound of the collected sound information, and to thereby improving precision of the sound recognition processing based on the collected sound information.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The above description is given as to the modified example of the display form of the output portion 130, but the display form of the output portion 130 is not limited to the above example. The output portion 130 may be, for example, a display provided in a wearable terminal (e.g., a watch or glasses) other than the head mounted display. In addition, the output portion 130 may be, for example, a display provided in an in-vehicle navigation system. In addition, the output portion 130 may be, for example, a display used in the healthcare field.

Furthermore, it is possible to create a program for causing the hardware such as CPU, ROM and RAM incorporated in the computer to execute functions equivalent to those of the information processing system 10 as described above. In addition, a computer-readable recording medium on which the program is recorded can also be provided.

Furthermore, the output controller 146 generates display control information for displaying the display content on the output portion 130 and outputs the generated display control information to the output portion 130, and thus can control the output portion 130 so that the output portion 130 displays the display content. The contents of the display control information may be changed appropriately in accordance with the system configuration.

Specifically, the program used to implement the information processing device 140 may be, for example, a web application. In such a case, the display control information may be created using markup languages such as hypertext markup language (HTML), standard generalized markup language (SGML), and extensible markup language (XML).

The position of each component is not limited to a particular position as long as the operation of the information processing system 10 described above is performed. In one specific example, the image input portion 110, the operation input portion 115, and the sound collecting portion 120, the output portion 130, and the information processing device 140 may be provided in different devices connected via a network. In this case, the information processing device 140 corresponds to, for example, a server such as a web server or a cloud server, and the image input portion 110, the operation input portion 115, and the sound collecting portion 120 and the output portion 130 may correspond to a client connected to the server via a network.

All the components included in the information processing device 140 may not be accommodated in the same device. For example, a part of the input image acquisition portion 141, the collected sound information acquisition portion 142, the operation detection portion 143, the recognition controller 144, the speech recognition processing portion 145, and the output controller 146 may be present in a device that is different from the information processing device 140. For example, the speech recognition processing portion 145 may be present in a server that is different from the information processing device 140 that includes the input image acquisition portion 141, the collected sound information acquisition portion 142, the operation detection portion 143, the recognition controller 144, and the output controller 146.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a recognition controller that causes a speech recognition processing portion to execute sound recognition processing based on collected sound information obtained by a sound collecting portion; and an output controller that generates an output signal to output a recognition result obtained through the sound recognition processing, wherein the output controller causes an output portion to output an evaluation result regarding a type of sound based on the collected sound information prior to the recognition result.

(2)

The information processing device according to (1), wherein the output portion is a display, and the output controller causes the output portion to display an evaluation result object corresponding to the evaluation result.

(3)

The information processing device according to (2), wherein the output controller causes the output portion to display a sound collection notification object for providing notification about sound collection when the collected sound information is obtained, and causes the sound collection notification object to be changed to the evaluation result object in accordance with the evaluation result when the evaluation result is obtained.

(4)

The information processing device according to (3), wherein the output controller causes the output portion to display the sound collection notification object corresponding to a volume of the collected sound information when the collected sound information is obtained.

(5)

The information processing device according to (2), wherein the output controller controls at least one of a shape, transparency, a color, a size, and motion of the evaluation result object on the basis of the evaluation result.

(6)

The information processing device according to (2), wherein the output controller causes the output portion to output different evaluation result objects when the evaluation result is greater than a threshold value and when the evaluation result is less than the threshold value.

(7)

The information processing device according to (2), wherein the recognition controller causes speech recognition processing based on the collected sound information to be performed when the evaluation result is greater than a threshold value.

(8)

The information processing device according to (2), wherein the recognition controller refrains from causing speech recognition processing based on the collected sound information to be performed when the evaluation result is less than a threshold value.

(9)

The information processing device according to (2), wherein the output controller determines the evaluation result object to be output by the output portion on the basis of a history of the evaluation result.

(10)

The information processing device according to (2), wherein the recognition controller moves the evaluation result object to a predetermined target position when the evaluation result is greater than a threshold value.

(11)

The information processing device according to (1), wherein the sound recognition processing includes processing of specifying a character string on the basis of the collected sound information.

(12)

The information processing device according to (6), wherein the output controller causes the output portion to output the threshold value.

(13)

The information processing device according to (6), wherein the recognition controller determines termination of a part serving as a target of speech recognition processing on the basis of timing when a period of time during which the evaluation result is less than the threshold value exceeds a predetermined period of time in the collected sound information.

(14)

The information processing device according to (6), wherein the recognition controller determines termination of a part serving as a target of speech recognition processing on the basis of timing when a period of time during which a volume is less than a predetermined volume exceeds a predetermined period of time in the collected sound information.

(15)

The information processing device according to (6), wherein the recognition controller adds or changes a condition for determining termination of a part serving as a target of speech recognition processing when the evaluation result is less than the threshold value after an utterance by a user and a volume of the collected sound information is greater than a predetermined volume.

(16)

The information processing device according to (1), wherein the evaluation result regarding the type of the sound based on the collected sound information is an evaluation result of likelihood of speech based on the collected sound information.

(17)

The information processing device according to (1), wherein the output controller causes the output portion to output different evaluation result objects when a first evaluation result regarding a type of sound based on the collected sound information is greater than a first threshold value and when a predetermined second evaluation result of the collected sound information is greater than a second threshold value.

(18)

The information processing device according to (1), wherein the sound recognition processing includes speech recognition processing based on the collected sound information.

(19)

A method of information processing, including:

causing a speech recognition processing portion to execute sound recognition processing based on collected sound information obtained by a sound collecting portion; and generating an output signal to output a recognition result obtained through the sound recognition processing, wherein an output portion is caused to output an evaluation result regarding a type of sound based on the collected sound information prior to the recognition result.

(20)

A program that causes a computer to function as an information processing device including:

a recognition controller that causes a speech recognition processing portion to execute sound recognition processing based on collected sound information obtained by a sound collecting portion; and an output controller that generates an output signal to output a recognition result obtained through the sound recognition processing, wherein the output controller causes an output portion to output an evaluation result regarding a type of sound based on the collected sound information prior to the recognition result.

(21)

The information processing device according to any one of (2) to (5), wherein the recognition controller refrains from moving the evaluation result object to the target position when the evaluation result is less than a threshold value.

(22)

The information processing device according to any one of (6) to (12), wherein the recognition controller adds or changes a condition for determining termination of a part serving as a target of the speech recognition processing when a volume of the collected sound information is greater than a predetermined volume before an utterance by a user.

(23)

The information processing device according to (1), wherein the recognition controller causes first sound recognition processing based on the collected sound information to be performed when a first evaluation result regarding a type of sound based on the collected sound information is greater than a first threshold value, and causes second sound recognition processing based on the collected sound information to be performed when a second evaluation result regarding a type of sound based on the collected sound information is greater than a second threshold value.

REFERENCE SIGNS LIST 10 information processing system
110 image input portion
115 operation input portion
120 sound collecting portion
130 output portion
140 information processing device (controller)
141 input image acquisition portion
142 collected sound information acquisition portion
143 operation detection portion
144 recognition controller
145 speech recognition processing portion
146 output controller

The invention claimed is:

1. An information processing device comprising:
a recognition controller configured to cause a speech recognition processing portion to execute sound recognition processing based on collected sound information obtained by a sound collecting portion; and an output controller configured to
generate an output signal to output a recognition result obtained through the sound recognition processing,
wherein the output controller causes an output portion to output an evaluation result regarding a type of sound based on the collected sound information prior to the recognition result, and
wherein the output portion comprises a display,
cause the output portion to display an evaluation result object corresponding to the evaluation result, and
move the displayed evaluation result object to a predetermined target position based on the recognition result,
wherein at least one display parameter of the displayed evaluation result object is changed according to an evaluated likelihood that the collected sound information on which the evaluation result is based contains speech, and
wherein the at least one display parameter of the displayed evaluation result object includes a shape of the displayed evaluation result object.

2. The information processing device according to claim 1,
wherein the output controller is further configured to cause the output portion to display a sound collection notification object for providing notification about sound collection when the collected sound information is obtained, and cause the sound collection notification object to be changed to the displayed evaluation result object in accordance with the evaluation result when the evaluation result is obtained.

3. The information processing device according to claim 2,
wherein the output controller is further configured to cause the output portion to display the sound collection notification object corresponding to a volume of the collected sound information when the collected sound information is obtained.

4. The information processing device according to claim 1,
wherein the at least one display parameter of the displayed evaluation result object further includes at least one of transparency, a color, a size, and motion of the displayed evaluation result object.

5. The information processing device according to claim 1,
wherein the output controller is further configured to cause the output portion to output different evaluation result objects when the evaluation result is greater than a threshold value and when the evaluation result is less than the threshold value.

6. The information processing device according to claim 5,
wherein the output controller is further configured to cause the output portion to output the threshold value.

7. The information processing device according to claim 5,
wherein the recognition controller is further configured to determine termination of a part serving as a target of speech recognition processing on the basis of timing when a period of time during which the evaluation result is less than the threshold value exceeds a predetermined period of time in the collected sound information.

8. The information processing device according to claim 5,
wherein the recognition controller is further configured to determine termination of a part serving as a target of speech recognition processing on the basis of timing when a period of time during which a volume is less than a predetermined volume exceeds a predetermined period of time in the collected sound information.

9. The information processing device according to claim 5,
wherein the recognition controller is further configured to add or change a condition for determining termination of a part serving as a target of speech recognition processing when the evaluation result is less than the threshold value after an utterance by a user and a volume of the collected sound information is greater than a predetermined volume.

10. The information processing device according to claim 1,
wherein the recognition controller is further configured to cause speech recognition processing based on the collected sound information to be performed when the evaluation result is greater than a threshold value.

11. The information processing device according to claim 1,
wherein the recognition controller is further configured to refrain from causing speech recognition processing based on the collected sound information to be performed when the evaluation result is less than a threshold value.

12. The information processing device according to claim 1,
wherein the output controller is further configured to determine the evaluation result object to be output by the output portion on the basis of a history of the evaluation result.

13. The information processing device according to claim 1,
wherein the sound recognition processing includes processing of specifying a character string on the basis of the collected sound information.

14. The information processing device according to claim 1,
wherein the output controller is further configured to cause the output portion to output different evaluation result objects when a first evaluation result regarding a type of sound based on the collected sound information is greater than a first threshold value and when a predetermined second evaluation result of the collected sound information is greater than a second threshold value.

15. The information processing device according to claim 1,
wherein the sound recognition processing includes speech recognition processing based on the collected sound information.

16. The information processing device according to claim 1,
wherein the shape of the displayed evaluation result object is changed, and at least one of a transparency, a color, a size, or a motion of the displayed evaluation result object is also changed, based on the evaluated likelihood that the collected sound information on which the evaluation result is based contains speech.

17. The information processing device according to claim 1,
wherein the shape of the displayed evaluation result object is changed according to the evaluated likelihood such that
when the evaluated likelihood is greater than a threshold value, the displayed evaluation result object has a first contour, and
when the evaluated likelihood is less than or equal to the threshold value, the displayed evaluation result object has a second contour that is different from the first contour.

18. A method of information processing, comprising:
causing a speech recognition processing portion to execute sound recognition processing based on collected sound information obtained by a sound collecting portion; and
generating an output signal to output a recognition result obtained through the sound recognition processing,
wherein an output portion is caused to output an evaluation result regarding a type of sound based on the collected sound information prior to the recognition result,
wherein the output portion is a display,
causing the output portion to display an evaluation result object corresponding to the evaluation result, and
moving the displayed evaluation result object to a predetermined target position based on the recognition result,
wherein at least one display parameter of the displayed evaluation result object is changed according to an evaluated likelihood that the collected sound information on which the evaluation result is based contains speech, and
wherein the at least one display parameter of the displayed evaluation result object includes a shape of the displayed evaluation result object.

19. A non-transitory computer-readable medium having embodied thereon a program, which when executed by a computer causes the computer to execute a method, the method comprising:
causing a speech recognition processing portion to execute sound recognition processing based on collected sound information obtained by a sound collecting portion;
generating an output signal to output a recognition result obtained through the sound recognition processing,
wherein an output portion is caused to output an evaluation result regarding a type of sound based on the collected sound information prior to the recognition result, and
wherein the output portion comprises a display;
causing the output portion to display an evaluation result object corresponding to the evaluation result; and
moving the displayed evaluation result object to a predetermined target position based on the recognition result,
wherein at least one display parameter of the displayed evaluation result object is changed according to an evaluated likelihood that the collected sound information on which the evaluation result is based contains speech, and
wherein the at least one display parameter of the displayed evaluation result object includes a shape of the displayed evaluation result object.

* * * * *